United States Patent
Shiono et al.

(10) Patent No.: US 11,609,020 B2
(45) Date of Patent: Mar. 21, 2023

(54) AIR CONDITIONING SYSTEM

(71) Applicant: DAIKIN INDUSTRIES, LTD., Osaka (JP)

(72) Inventors: Yuusuke Shiono, Osaka (JP); Norihiro Nabeshima, Osaka (JP); Makoto Ikeda, Osaka (JP); Atsushi Matsubara, Osaka (JP); Akio Tasaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 870 days.

(21) Appl. No.: 16/468,503

(22) PCT Filed: Dec. 6, 2017

(86) PCT No.: PCT/JP2017/043814
§ 371 (c)(1),
(2) Date: Jun. 11, 2019

(87) PCT Pub. No.: WO2018/110388
PCT Pub. Date: Jun. 21, 2018

(65) Prior Publication Data
US 2020/0088438 A1 Mar. 19, 2020

(30) Foreign Application Priority Data

Dec. 12, 2016 (JP) .............................. JP2016-240661

(51) Int. Cl.
*F24F 11/63* (2018.01)
*F24F 11/64* (2018.01)
(Continued)

(52) U.S. Cl.
CPC .............. *F24F 11/76* (2018.01); *F24F 11/46* (2018.01); *F24F 11/63* (2018.01); *F24F 2003/005* (2013.01)

(58) Field of Classification Search
CPC ............ F24F 11/62; F24F 11/63; F24F 11/64; F24F 11/65; F24F 11/74; F24F 11/76; F24F 11/77; F24F 7/06
(Continued)

(56) References Cited

U.S. PATENT DOCUMENTS 7,743,620 B1 * 6/2010 Severson ................ F24F 1/022
62/259.4
2005/0257537 A1 * 11/2005 Chang ...................... F24F 11/77
236/44 C (Continued)

FOREIGN PATENT DOCUMENTS

JP 48-2756 1/1973
JP 52-141039 11/1977
(Continued)

OTHER PUBLICATIONS

International Search Report, issued in PCT/JP2017/043814, dated Mar. 6, 2018.

*Primary Examiner* — Ko-Wei Lin
(74) *Attorney, Agent, or Firm* — Birch, Stewart, Kolasch & Birch, LLP

(57) ABSTRACT

An air conditioning system suppresses energy consumption by efficient shared use of air in a common space that is not subjected to air conditioning in an indoor area, among a plurality of air conditioners for the purpose of heat exchange. A plurality of air conditioners each include: a usage-side heat exchanger configured to carry out heat exchange with air in an air-conditioning target space; a heat source-side heat exchanger configured to carry out heat transfer to and from the usage-side heat exchanger; and a heat source-side fan configured to feed air from a common space to the heat source-side heat exchanger and to blow the air into the common space. The heat source-side heat exchangers of the air conditioners are disposed in the (Continued)

common space. A first ventilation fan whose airflow volume is changeable is disposed near an exhaust port through which air is discharged from the common space toward an outdoor area. A controller changes the airflow volume of the ventilation fan, based on information on an air temperature of the common space.

4 Claims, 15 Drawing Sheets

(51) Int. Cl.
*F24F 11/76* (2018.01)
*F24F 11/46* (2018.01)
*F24F 3/00* (2006.01)

(58) Field of Classification Search
USPC ........................................ 454/248, 249, 252
See application file for complete search history.

(56) References Cited

U.S. PATENT DOCUMENTS

| 2008/0113612 | A1* | 5/2008 | Chich ................. | F24F 11/0001 |
| | | | | 454/367 |
| 2012/0149291 | A1* | 6/2012 | Roderick ............ | F24F 11/0001 |
| | | | | 454/251 |
| 2013/0048267 | A1* | 2/2013 | Koretomo ............... | F24F 13/14 |
| | | | | 165/300 |
| 2016/0290675 | A1* | 10/2016 | Hashino ................... | F24F 11/62 |
| 2018/0163984 | A1* | 6/2018 | Alberth, Jr. .............. | F24F 11/62 |
| 2019/0242597 | A1* | 8/2019 | Hamada .................... | F24F 3/06 |

FOREIGN PATENT DOCUMENTS

| JP | 4-103541 U | 9/1992 |
| JP | 11-132512 A | 5/1999 |
| JP | 2009-250442 A | 10/2009 |
| JP | 2011-149654 A | 8/2011 |

* cited by examiner

AIR CONDITIONING SYSTEM

TECHNICAL FIELD

The present invention relates to an air conditioning system. More particularly, the present invention relates to an air conditioning system for implementing air conditioning in an air-conditioning target space of an indoor area by carrying out heat exchange with air in a common space that is disposed on a periphery of the air-conditioning target space in the indoor area and is not subjected to air conditioning.

BACKGROUND ART

An air conditioning system that has been proposed in the related art includes a plurality of compact unitary air conditioners each implementing air conditioning utilizing a common space such as a roof space that is not subjected to air conditioning in an indoor area. For example, Patent Literature 1 (JP S48-2756 A) discloses a unitary air conditioner including a temperature-regulating heat exchanger and a heat-dissipating heat exchanger for a refrigeration cycle. The temperature-regulating heat exchanger and the heat-dissipating heat exchanger are disposed at particularly a boundary between a room and a roof space in an indoor area. In addition, air in a common space is used for heat exchange by a plurality of heat-dissipating heat exchangers of a plurality of unitary air conditioners.

SUMMARY OF THE INVENTION

Technical Problem

In the air conditioning system disclosed in Patent Literature 1, for example, the common space such as the roof space in the indoor area serves as a heat-insulating air flow path, and an exhaust fan ventilates the roof space. However, it is sometimes difficult only by the ventilation of the roof space with the exhaust fan disclosed in Patent Literature 1 to achieve an efficient air conditioning operation, depending on the structure of a building, the number of unitary air conditioners, and the arrangement of the unitary air conditioners.

The present invention provides an air conditioning system capable of suppressing energy consumption by efficient shared use of air in a common space that is not subjected to air conditioning in an indoor area, among a plurality of air conditioners for the purpose of heat exchange.

Solutions to Problem

A first aspect of the present invention provides an air conditioning system for implementing air conditioning in an air-conditioning target space of an indoor area by carrying out heat exchange with air in a common space that is disposed on a periphery of the air-conditioning target space in the indoor area and is not subjected to air conditioning. The air conditioning system includes a plurality of air conditioners, at least one ventilation fan whose airflow volume is changeable, and controller. Each of the air conditioners includes: a usage-side heat exchanger configured to carry out heat exchange with air in the air-conditioning target space; a heat source-side heat exchanger configured to carry out heat transfer to and from the usage-side heat exchanger, a plurality of the heat source-side heat exchanger being disposed in the common space; and a heat source-side fan configured to feed air from the common space to the heat source-side heat exchanger and to blow the air into the common space. The ventilation fan is disposed near an intake port through which air in an outdoor area is taken in the common space and/or an exhaust port through which air is discharged from the common space toward the outdoor area. The controller is configured to change the airflow volume of the ventilation fan, based on information relating to an air temperature of the common space.

In the air conditioning system according to the first aspect, the controller changes the airflow volume of the ventilation fan, based on the information relating to the air temperature of the common space, thereby changing a flow rate of air to be taken in through the intake port and a flow rate of air to be discharged through the exhaust port. The controller thus adjusts the air temperature of the common space. For example, a change in total amount of heat exchange by the air conditioners and a change in air temperature of the outdoor area in the vicinity of the intake port occasionally cause a change in air temperature of the common space. In such a case, the controller increases the airflow volume of the ventilation fan as long as improvement in efficiency of the air conditioners is obtained and consequently improvement in efficiency of the entire air conditioning system is obtained even when an amount of electric power to be consumed by the ventilation fan is increased. In addition, the controller decreases the airflow volume of the ventilation fan to reduce an amount of electric power to be consumed by the ventilation fan as long as improvement in efficiency of the air conditioners is obtained and consequently improvement in efficiency of the entire air conditioning system is obtained even when the airflow volume of the ventilation fan is decreased.

A second aspect of the present invention provides the air conditioning system according to the first aspect, further including at least one common space temperature sensor configured to detect the air temperature of the common space, wherein the controller changes the airflow volume of the ventilation fan in accordance with the temperature detected by the common space temperature sensor.

In the air conditioning system according to the second aspect, the common space temperature sensor detects an actual air temperature of the common space. Therefore, the air conditioning system changes the airflow volume of the ventilation fan while actually determining whether the actual air temperature of the common space is efficiently sharable among the air conditioners for the purpose of heat exchange.

A third aspect of the present invention provides the air conditioning system according to the first or second aspect, wherein the controller is configured to detect the number of operating air conditioners among the air conditioners, and the controller employs the number of operating air conditioners among the air conditioners as the information relating to the air temperature of the common space, and changes the airflow volume of the ventilation fan, based on the number of operating air conditioners.

In the air conditioning system according to the third aspect, the controller changes the airflow volume of the ventilation fan, based on the number of operating air conditioners among the air conditioners. Therefore, the controller increases the airflow volume of the ventilation fan to suppress the change in air temperature of the common space if the air temperature of the common space is apt to change so as to degrade heat exchange efficiency of the air conditioners since the number of operating air conditioners is large. On the other hand, the controller decreases the airflow volume of the ventilation fan to reduce an amount of electric power to be consumed by the ventilation fan if the air temperature of the common space is less prone to change so as to degrade the heat exchange efficiency of the air conditioners since the number of operating air conditioners is small.

A fourth aspect of the present invention provides the air conditioning system according to the first or second aspect, wherein the controller is configured to acquire information relating to processing loads of the air conditioners, and the controller employs the information relating to the processing loads of the air conditioners as the information relating to the air temperature of the common space, and changes the airflow volume of the ventilation fan, based on the processing loads.

In the air conditioning system according to the fourth aspect, the controller changes the airflow volume of the ventilation fan, based on the processing loads of the air conditioners. Therefore, the controller increases the airflow volume of the ventilation fan to suppress the change in air temperature of the common space if the air temperature of the common space is apt to change so as to degrade heat exchange efficiency of the air conditioners since the processing loads are large. On the other hand, the controller decreases the airflow volume of the ventilation fan to reduce an amount of electric power to be consumed by the ventilation fan if the air temperature of the common space is less prone to change so as to degrade the heat exchange efficiency of the air conditioners since the processing loads are small.

A fifth aspect of the present invention provides the air conditioning system according to any of the first to fourth aspects, wherein the controller performs feedback control to compare information relating to an actual temperature of the common space with information relating to a target temperature of the common space and to change the airflow volume of the ventilation fan such that the actual temperature of the common space becomes equal to the target temperature of the common space.

In the air conditioning system according to the fifth aspect, the controller performs the feedback control to change the airflow volume of the ventilation fan such that the actual temperature of the common space becomes equal to the target temperature of the common space. This configuration therefore enables efficient modification of the airflow volume of the ventilation fan even if unexpected disturbance causes the air temperature of the common space to change so as to degrade the heat exchange efficiency of the air conditioners.

A sixth aspect of the present invention provides the air conditioning system according to the fifth aspect, wherein the controller is configured to acquire information relating to prospective air temperatures relevant to a plurality of the air conditioners in the common space, and the controller performs feedforward control to correct the change in airflow volume of the ventilation fan, based on the information relating to the prospective air temperature of the common space.

In the air conditioning system according to the sixth aspect, the controller performs the feedforward control to correct the change in airflow volume of the ventilation fan, based on the information relating to the prospective air temperature of the common space. Therefore, the air conditioning system previously makes preparations for suppressing occurrence of a situation in which expectable disturbance causes the air temperature of the common space to change so as to degrade the heat exchange efficiency of the air conditioners. The air conditioning system thus minimizes a difference between the air temperature and target temperature of the common space due to the disturbance.

Advantageous Effects of Invention

The air conditioning system according to the first aspect of the present invention suppresses energy consumption by efficient shared use of air in the common space among the air conditioners for the purpose of heat exchange.

The air conditioning system according to the second aspect of the present invention enables accurate control in accordance with a situation of the common space.

The air conditioning system according to the third aspect of the present invention improves its entire energy efficiency of the air conditioning system while suppressing an increase in burden on the controller.

The air conditioning system according to the fourth aspect of the present invention easily improves its entire energy efficiency.

The air conditioning system according to the fifth or sixth aspect of the present invention enables stable and efficient shared use of air in the common space among the air conditioners for the purpose of heat exchange.

DESCRIPTION OF EMBODIMENTS

First Embodiment (1) General Configuration

Figure 1:
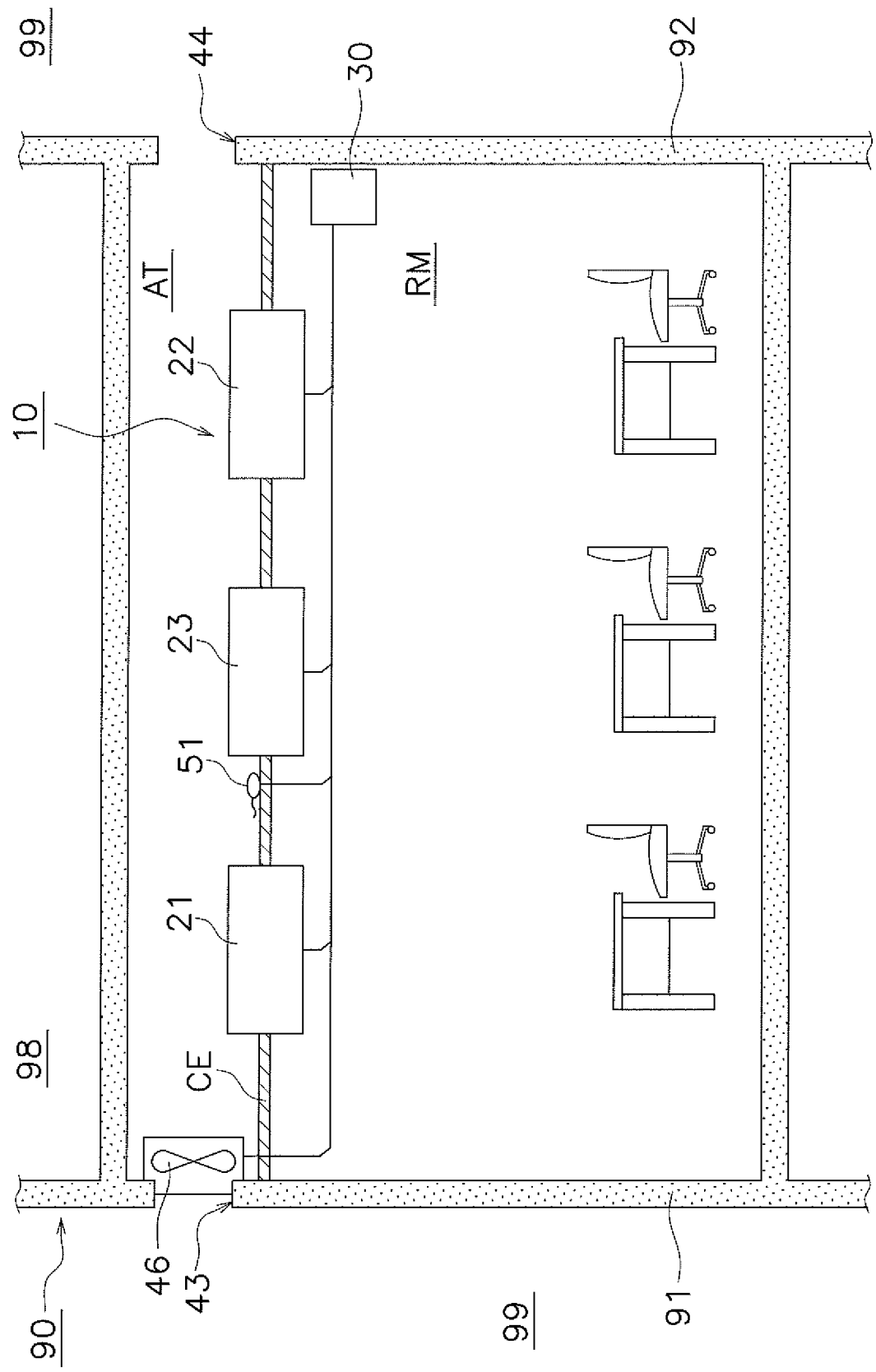
FIG. 1 is a schematic sectional view of a building in which an air conditioning system according to a first embodiment is installed.
Figure 2:
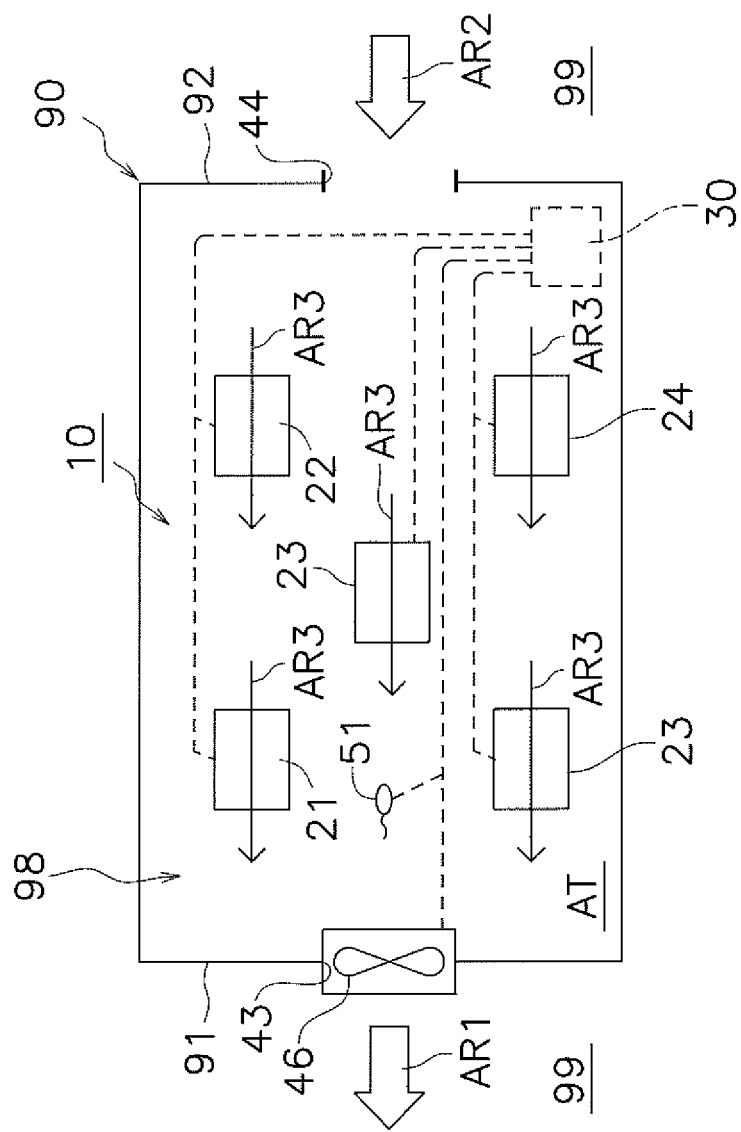
FIG. 2 is a schematic plan view of the building in which the air conditioning system according to the first embodiment is installed.

With reference to FIGS. 1 and 2, a description will be given of an air conditioning system according to a first embodiment of the present invention. An air conditioning system 10 illustrated in FIGS. 1 and 2 is configured to implement air conditioning in a room RM as an air-conditioning target space of an indoor area 98 by carrying out heat exchange with air in an attic AT as a common space that is disposed on a periphery of the room RM in the indoor area 98 and is not subjected to air conditioning. The first embodiment describes a case where the air conditioning system 10 implements air conditioning in one room RM; however, the present invention is applicable to a case where the air conditioning system 10 implements air conditioning in a plurality of rooms. The air conditioning system 10 to be described here controls a path or paths over which air flows in one continuous common space. Alternatively, the present invention is applicable to one air conditioning system configured to control paths over which air flows in a plurality of independent common spaces such as the attic of a first floor and the attic of a second floor in a building.

Figure 3:
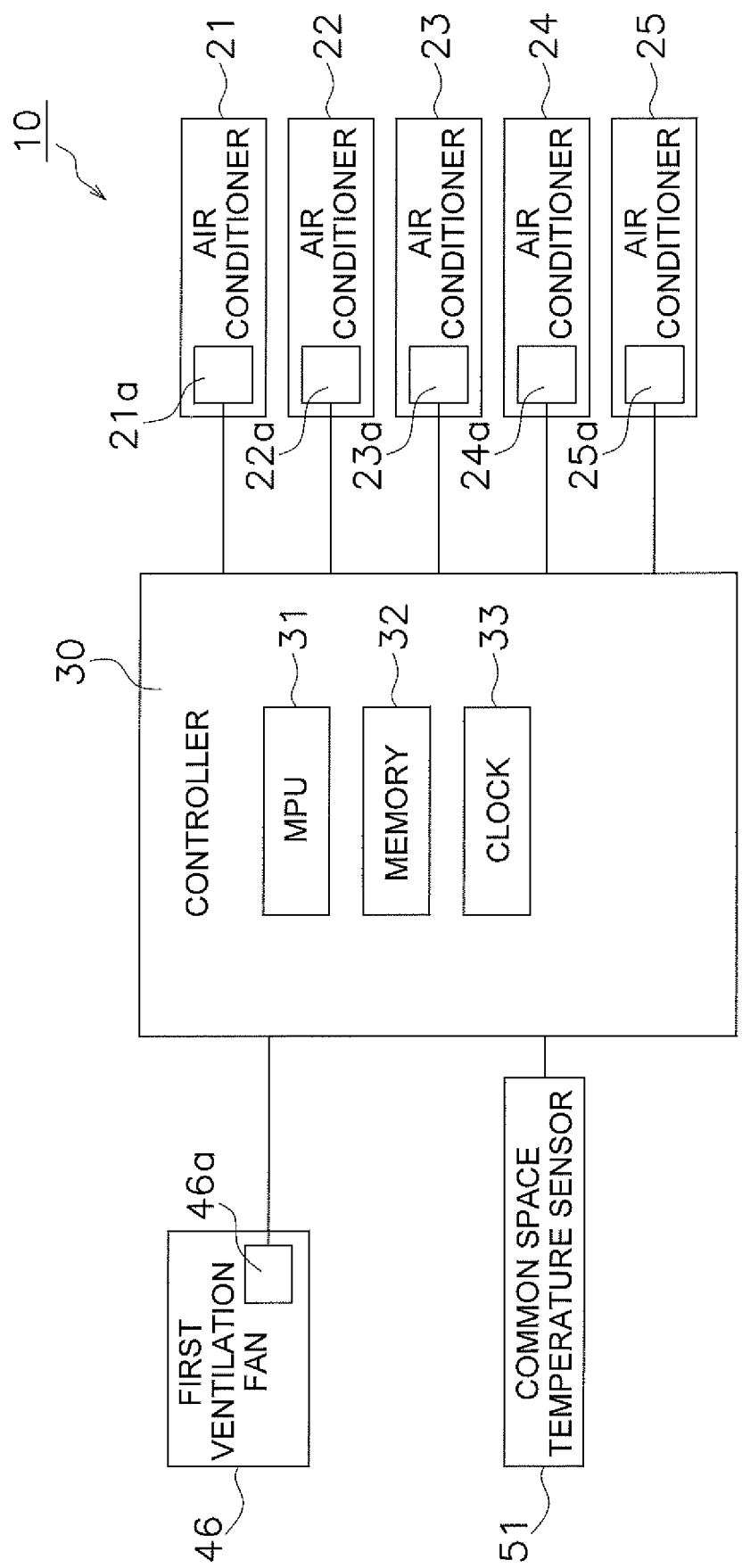
FIG. 3 is a block diagram of an exemplary configuration of the air conditioning system according to the first embodiment.

The air conditioning system 10 illustrated in FIG. 1 includes a plurality of unitary air conditioners 21, 22, 23, 24, and 25, a controller 30, a first ventilation fan 46, and a common space temperature sensor 51. FIG. 3 schematically illustrates the relationship between the controller 30 and the other constituent elements of the air conditioning system 10. The controller 30 controls all the five unitary air conditioners 21 to 25. The controller 30 also controls the first ventilation fan 46. The controller 30 changes an airflow volume of the first ventilation fan 46, based on a temperature to be detected by the common space temperature sensor 51, the temperature being information relating to an air temperature of the attic AT as the common space.

(2) Specific Configuration (2-1) Unitary Air Conditioners 21 to 25

Figure 4:
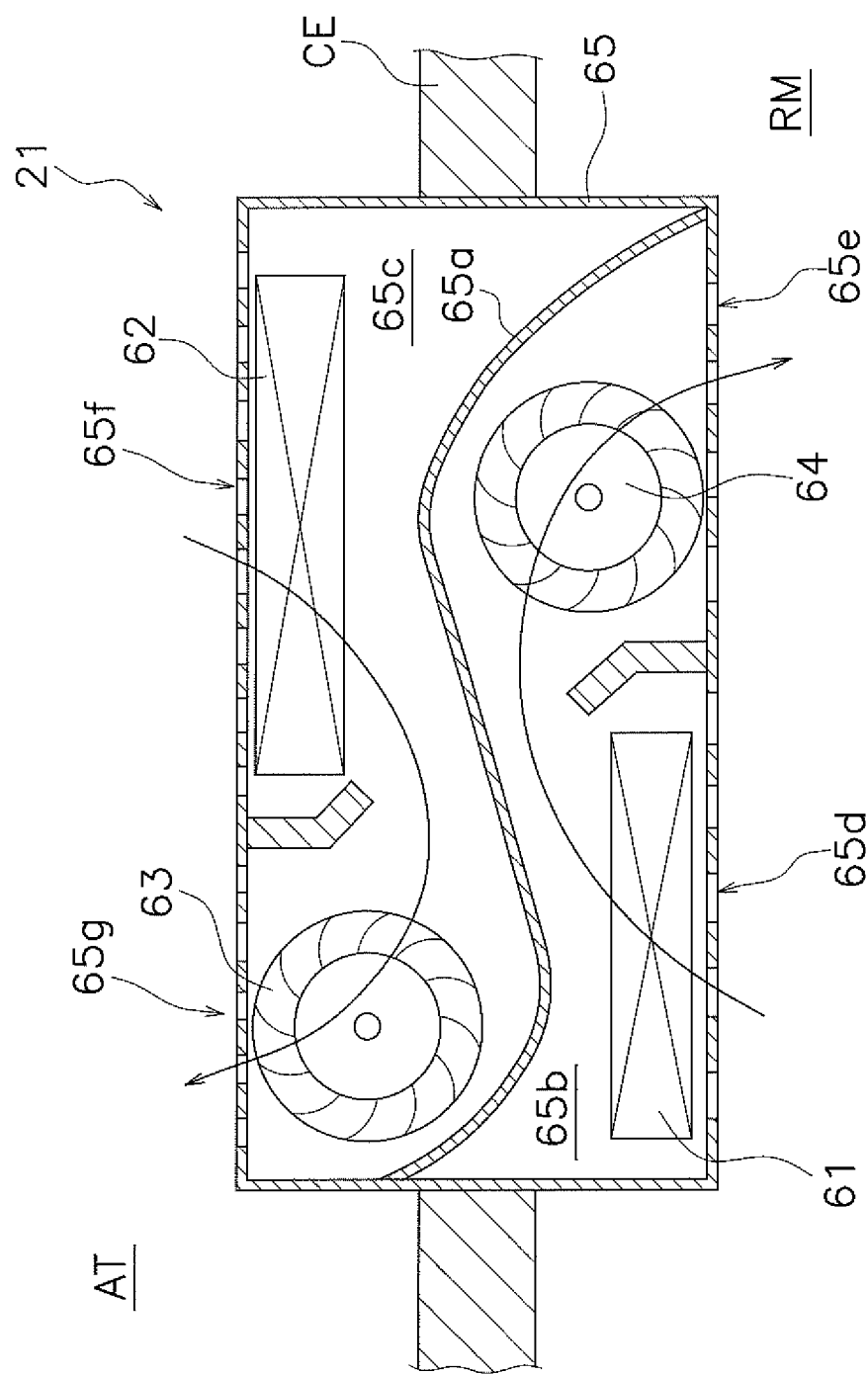
FIG. 4 is a schematic sectional view of a unitary air conditioner constituting the air conditioning system.
Figure 5:
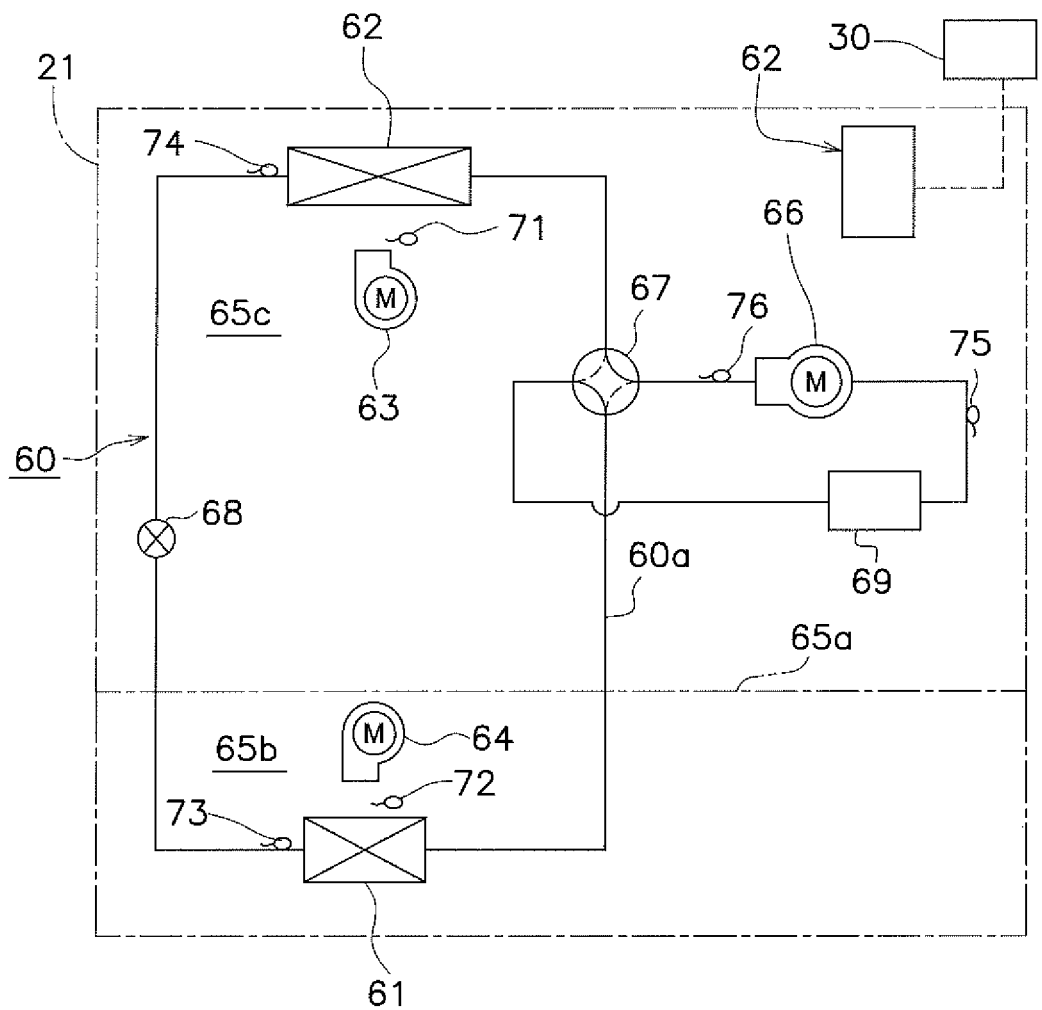
FIG. 5 is a circuit diagram of an exemplary refrigerant circuit in the air conditioner illustrated in FIG. 4.

The unitary air conditioners 21 to 25 may be different in structure from one another. It is however assumed in the following description that the unitary air conditioners 21 to 25 are equal in structure to one another. With reference to FIGS. 4 and 5, therefore, a description will be given of the air conditioner 21 among the unitary air conditioners 21 to 25. The air conditioner 21 includes: a usage-side heat exchanger 61 configured to carry out heat exchange with air in the room RM as the air-conditioning target space; a heat source-side heat exchanger 62 configured to carry out heat transfer to and from the usage-side heat exchanger 61; a heat source-side fan 63 configured to feed air from the attic AT to the heat source-side heat exchanger 62 and then blow the air into the attic AT; a usage-side fan 64 configured to feed air from the room RM to the usage-side heat exchanger 61 and then blow the air into the room RM; and a casing 65. As in the air conditioner 21, each of the remaining unitary air conditioners 22 to 25 includes a usage-side heat exchanger 61, a heat source-side heat exchanger 62, a heat source-side fan 63, a usage-side fan 64, and a casing 65 in which the components 61 to 64 are housed. The heat source-side heat exchangers 62 of the air conditioners 22 to 25 thus share the air in the attic AT as the common space.

Each of the usage-side heat exchanger 61 and the heat source-side heat exchanger 62 may be a fin-and-tube heat exchanger that includes a large number of fins (not illustrated) and a plurality of heat transfer tubes (not illustrated) respectively penetrating through the fins and is configured to carry out heat exchange between air passing through each fin and a refrigerant flowing through the corresponding heat transfer tube. Heat transfer between the usage-side heat exchanger 61 and the heat source-side heat exchanger 62 is effected by a refrigerant flowing through a refrigerant circuit 60 illustrated in FIG. 5.

Each of the heat source-side fan 63 and the usage-side fan 64 may be, for example, a centrifugal fan, an axial fan, or a cross-flow fan. Each of the heat source-side fan 63 and the usage-side fan 64 illustrated in FIG. 4 are cross-flow fans. As to the heat source-side fan 63 and the usage-side fan 64, the numbers of rotations are changeable independently of each other. As to the air conditioners 21 to 25, accordingly, the controller 30 controls a heat source-side airflow volume of the heat source-side fan 63 and a usage-side airflow volume of the usage-side fan 64 independently of and separately from each other on the heat source side and the usage side. The controller 30 also controls the air conditioners independently of one another.

The casing 65 of the air conditioner 21 includes a partition plate 65a dividing a space inside the casing 65 into an air-conditioning target space-side section 65b and a common space-side section 65c. The casing 65 has, in its one side exposed to the room RM, a room-side intake port 65d through which air in the room RM is taken in, and a room-side blow-out port 65e through which air is blown into the room RM. The casing 65 also has, in its another side exposed to the attic AT, a common space-side intake port 65f through which air in the attic AT is taken in, and a common space-side blow-out port 65g through which air is blown into the attic AT.

FIG. 5 illustrates an example of the refrigerant circuit 60. The refrigerant circuit 60 includes a compressor 66, a four-way switching valve 67, the heat source-side heat exchanger 62, an expansion mechanism 68, the usage-side heat exchanger 61, and an accumulator 69 that are interconnected via a refrigerant pipe 60a. During a cooling operation, the four-way switching valve 67 establishes a connection indicated by a solid line, so that the refrigerant discharged from the compressor 66 flows toward the heat source-side heat exchanger 62 via the four-way switching valve 67. The heat source-side heat exchanger 62 cools the refrigerant by heat exchange with air in the attic AT. The expansion mechanism 68 then expands the refrigerant. The resultant refrigerant flows toward the usage-side heat exchanger 61. The usage-side heat exchanger 61 warms the refrigerant by heat exchange with air in the room RM. The resultant refrigerant is then sucked into the compressor 66 via the four-way switching valve 67 and the accumulator 69. During a heating operation, the four-way switching valve 67 establishes a connection indicated by a broken line, so that the refrigerant discharged from the compressor 66 flows toward the usage-side heat exchanger 61 via the four-way switching valve 67. The usage-side heat exchanger 61 cools the refrigerant by heat exchange with air in the room RM. The expansion mechanism 68 then expands the refrigerant. The resultant refrigerant flows toward the heat source-side heat exchanger 62. The heat source-side heat exchanger 62 warms the refrigerant by heat exchange with air in the attic AT. The resultant refrigerant is then sucked into the compressor 66 via the four-way switching valve 67 and the accumulator 69.

The air conditioner 21 includes temperature sensors 71 to 76 for the purpose of control. The temperature sensor 71 is configured to detect a temperature of air in the attic AT, the air being not subjected to heat exchange yet by the heat source-side heat exchanger 62. The temperature sensor 72 is configured to detect a temperature of air in the room RM, the air being not subjected to heat exchange yet by the usage-side heat exchanger 61. The temperature sensor 73 is disposed between the expansion mechanism 68 and the usage-side heat exchanger 61, and is configured to detect a temperature of the refrigerant at a port of the usage-side heat exchanger 61. The temperature sensor 74 is disposed between the expansion mechanism 68 and the heat source-side heat exchanger 62, and is configured to detect a temperature of the refrigerant at a port of the heat source-side heat exchanger 62. The temperature sensor 75 is disposed between the accumulator 69 and the compressor 66, and is configured to detect a temperature of the refrigerant to be sucked into the compressor 66. The temperature sensor 76 is disposed between the compressor 66 and the four-way switching valve 67, and is configured to detect a temperature of the refrigerant discharged from the compressor 66. The air conditioner 21 is controlled by using the temperature sensors 71 to 76 such that the degree of superheating of the refrigerant to be sucked into the compressor 66 falls within a predetermined range. The air conditioner 21 is also controlled such that the temperature of the refrigerant discharged from the compressor 66 takes a value equal to or less than a predetermined value. In the air conditioner 21, the refrigerant circuit 60 implements a refrigeration cycle, particularly a vapor compression refrigeration cycle.

The compressor 66 has a capacity that is changeable by a change in number of rotations (driving frequency). Each of the air conditioners 21 to 25 can adapt to a processing load to be set by adjustments of, for example, the number of rotations of the compressor 66, the number of rotations of the heat source-side fan 63, and the number of rotations of the usage-side fan 64. The processing load increases or decreases owing to, for example, a difference between a set temperature of the room RM and a temperature of air to be sucked into each of the air conditioners 21 to 25 from the room RM. In the cooling operation, for example, the processing load in a case where the set temperature is 28° C. and the temperature of the air to be sucked is 32° C. is larger than the processing load in a case where the set temperature is 28° C. and the temperature of the air to be sucked is 30° C. Also in the cooling operation, for example, the processing load in a case where the set temperature is 26° C. and the temperature of the air to be sucked is 30° C. is larger than the processing load in a case where the set temperature is 28° C. and the temperature of the air to be sucked is 30° C. In the heating operation, for example, the processing load in a case where the set temperature is 24° C. and the temperature of the air to be sucked is 18° C. is larger than the processing load in a case where the set temperature is 24° C. and the temperature of the air to be sucked is 20° C. In addition, the processing load in a case where the set temperature is 24° C. and the temperature of the air to be sucked is 20° C. is larger than the processing load in a case where the set temperature is 22° C. and the temperature of the air to be sucked is 20° C.

(2-2) Exhaust Port 43 and Intake Port 44

A building 90 has an exhaust port 43 in its west wall 91. The building 90 also has an intake port 44 in its east wall 92. Each of the west wall 91 and the east wall 92 serves as a boundary between the indoor area 98 of the building 90 and an outdoor area 99. The exhaust port 43 and the intake port 44 allow airflow between the outdoor area 99 and the attic AT. In the first embodiment, the exhaust port 43 is formed in the west wall 91, and the intake port 44 is formed in the east wall 92; however, the exhaust port 43 and the intake port 44 are not necessarily formed in the west and the east, respectively. For example, the exhaust port 43 and the intake port 44 may be formed in the north and the south, respectively. Alternatively, the exhaust port 43 and the intake port 44 may be formed in the southeast and the southwest, respectively. Still alternatively, the exhaust port 43 may be formed in a part of the east side of a north wall, and the intake port 44 may be formed in a part of the west side of the same north wall.

(2-3) First Ventilation Fan 46

The first ventilation fan 46 may be, for example, a centrifugal fan, an axial fan, or a cross-flow fan. The first ventilation fan 46 illustrated in FIG. 2 is an axial fan. The first ventilation fan 46 is an exhaust fan mounted to the exhaust port 43. In other words, the first ventilation fan 46 is disposed near the exhaust port 43. A position where a ventilation fan is mounted is not limited as long as the ventilation fan is disposed near a ventilation port. Therefore, the first ventilation fan 46 is not necessarily mounted to the exhaust port 43. For example, the first ventilation fan 46 may be mounted at a remote location where an air current is produced at the ventilation port.

When the first ventilation fan 46 is driven, an air current directed from the attic AT to the outdoor area 99 through the exhaust port 43 is produced as indicated by an arrow AR1 in FIG. 2. The air current indicated by the arrow AR1 forms a negative pressure in the attic AT to produce an air current directed from the outdoor area 99 to the attic AT through the intake port 44 (i.e., an air current indicated by an arrow AR2). Consequently, an air current directed from the intake port 44 to the exhaust port 43 (i.e., an air current indicated by an arrow AR3) is produced in the attic AT.

(2-4) Controller 30

As illustrated in FIG. 3, the controller 30 includes a micro processing unit (MPU) 31, a memory 32, and a clock 33. The controller 30 is connected to control units 21*a*, 22*a*, 23*a*, 24*a*, and 25*a* of the air conditioners 21, 22, 23, 24, and 25. The controller 30 is also connected to a control unit 46*a* of the first ventilation fan 46. The controller 30 is also connected to the common space temperature sensor 51 to receive a temperature detected by the common space temperature sensor 51. The controller 30 also receives information items on operating states of the air conditioners 21 to 25, from the control units 21*a* to 25*a*. The controller 30 thus determines whether each of the air conditioners 21 to 25 is operated. The controller 30 also receives data for calculating a processing load, from the control units 21*a* to 25*a*.

For example, the memory 32 of the controller 30 stores therein a program for controlling the operation (to be described later) of the air conditioning system 10 according to the first embodiment. The MPU 31 sends commands to the control units 21*a* to 25*a*, and 46*a* in accordance with the program stored in the memory 32. In the first embodiment, the controller 30 is disposed inside the building 90; however, the controller 30 may be disposed outside the building 90. For example, the memory function of the controller 30 and the processing function of the controller 30 may be provided at different places, respectively.

(2-5) Common Space Temperature Sensor 51

The common space temperature sensor 51 may be, for example, a thermistor. The common space temperature sensor 51 is mounted to a place that is less susceptible to an influence of air to be blown from the first ventilation fan 46 and an influence of air to be blown from each of the air conditioners 21 to 25. Examples of such a place may include: a place which is a side of the attic AT of the first ventilation fan 46; a place close to a ceiling CE and not directly exposed to air to be blown from the common space-side blow-out port 65g (see FIG. 4) of each of the air conditioners 21 to 25; and a high place away from the ceiling CE.

(3) General Operation (3-1) Cooling Operation

In the cooling operation, each of the unitary air conditioners 21 to 25 blows cold air into the room RM. The cold air to be blown into the room RM typically has a temperature lower than an air temperature of the outdoor area 99. At this time, each of the air conditioners 21 to 25 blows hot air into the attic AT. The hot air to be blown into the attic AT typically has a temperature higher than an air temperature of the outdoor area 99. Accordingly, if the attic AT is not subjected to ventilation, the hot air blown from each of the air conditioners 21 to 25 warms air in the attic AT to raise an air temperature of the attic AT. The air temperature rise in the attic AT causes degradation in heat exchange efficiency of the air conditioners 21 to 25 in the cooling operation. The first ventilation fan 46 is driven to ventilate the attic AT, thereby suppressing the air temperature rise in the attic AT. The degradation in heat exchange efficiency is thus suppressed. However, even when the first ventilation fan 46 is operated excessively, the air temperature of the attic AT does not become lower than an air temperature of the outdoor area 99, and electric energy consumption by the first ventilation fan 46 causes degradation in energy efficiency in the entire system. The number of rotations of the first ventilation fan 46 is preferably increased for improving the heat exchange efficiency of the heat source-side heat exchangers 62 of the air conditioners 21 to 25. In addition, the number of rotations of the first ventilation fan 46 is preferably decreased for suppressing electric power consumption by the first ventilation fan 46. In order to maximize the energy efficiency, the number of rotations of the first ventilation fan 46 has an optimum value or an optimum range to be set in consideration of both the purposes.

However, the optimum value or optimum range for the number of rotations of the first ventilation fan 46 varies depending on operating conditions of the air conditioners 21 to 25. In the cooling operation, for example, the optimum value or optimum range set for the number of rotations in a case where only two of the air conditioners 21 to 25 are operated is smaller than that in a case where all the air conditioners 21 to 25 are operated to the limit. Consequently, the number of rotations of the first ventilation fan 46 is adjusted to have an appropriate value in accordance with the operating conditions of the air conditioners 21 to 25, so that the energy efficiency is improved as compared with a case where the first ventilation fan 46 is driven at a constant number of rotations.

Figure 6:
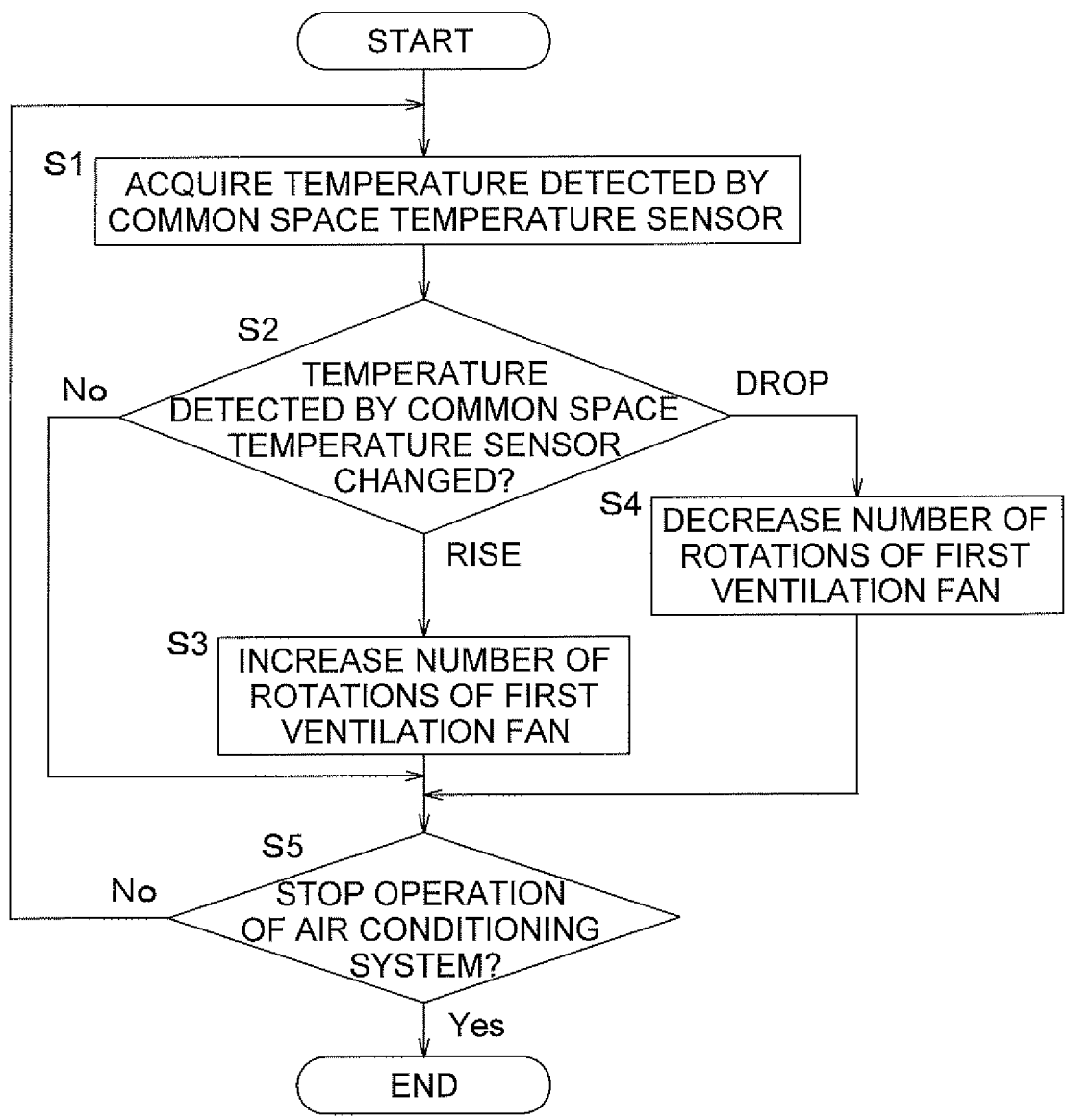
FIG. 6 is a flowchart of exemplary operation of the air conditioning system according to the first embodiment in a cooling operation.

It is difficult to constantly keep the number of rotations of the first ventilation fan 46 at the optimum value. In order to improve the energy efficiency by appropriately adjusting the number of rotations of the first ventilation fan 46, for example, the number of rotations is controlled to make constant a temperature to be detected by the common space temperature sensor 51 configured to detect an air temperature of the attic AT. With reference to a flowchart of FIG. 6, next, a description will be given of a method of adjusting the number of rotations of the first ventilation fan 46, based on an air temperature of the attic AT. In the cooling operation, for example, when the number of rotations of the first ventilation fan 46 is smaller than the optimum value, hot air blown from each of the air conditioners 21 to 25 raises the air temperature of the attic AT. In view of this, first, the controller 30 acquires a temperature detected by the common space temperature sensor 51 (step S1).

Next, the controller 30 makes a determination as to an adjustment to the number of rotations of the first ventilation fan 46, based on the temperature detected by the common space temperature sensor 51 (step S2). For example, when there is no change in air temperature of the attic AT by the end of a first interval set in advance, the controller 30 maintains the number of rotations of the first ventilation fan 46. The controller 30 is configured to detect the end of the first interval, using the clock 33. When there is no change in temperature detected by the common space temperature sensor 51, the processing proceeds to step S5. When the air temperature of the attic AT rises by the end of the first interval, the controller 30 increases the number of rotations of the first ventilation fan 46, in accordance with an increase of the air temperature (step S3). The processing then proceeds to step S5. When the air temperature of the attic AT declines by the end of the first interval, the controller 30 decreases the number of rotations of the first ventilation fan 46, in accordance with a decrease of the air temperature (step S4). The processing then proceeds to step S5. In step S5, the controller 30 determines whether to stop the operation of the air conditioning system 10. When the controller 30 makes a determination to continuously operate the air conditioning system 10, the processing returns to step S1. When the controller 30 makes a determination to stop the air conditioning system 10, then the controller 30 terminates the operation (steps S1 to S5) for adjusting the airflow volume of the first ventilation fan 46. When the processing returns to step S1, the controller 30 returns to the beginning of the first interval. As described above, the controller 30 changes the airflow volume of the first ventilation fan 46 by changing the number of rotations of the first ventilation fan 46, based on the temperature detected by the common space temperature sensor 51, the temperature being information relating to an air temperature of the attic AT.

(3-2) Heating Operation

The foregoing description concerns the case where the room RM is cooled by the air conditioners 21 to 25. Next, a brief description will be given of a case where the room RM is heated. In the heating operation, each of the air conditioners 21 to 25 blows hot air into the room RM. The hot air to be blown into the room RM typically has a temperature higher than an air temperature of the outdoor area 99. At this time, each of the air conditioners 21 to 25 blows cold air into the attic AT. The cold air to be blown into the attic AT typically has a temperature lower than an air temperature of the outdoor area 99. Accordingly, if the attic AT is not subjected to ventilation, the cold air blown from each of the air conditioners 21 to 25 cools air in the attic AT to lower an air temperature of the attic AT. The air temperature drop in the attic AT causes degradation in heat exchange efficiency of the air conditioners 21 to 25 in the heating operation. The first ventilation fan 46 is driven to ventilate the attic AT, thereby suppressing the air temperature drop in the attic AT. The degradation in heat exchange efficiency is thus suppressed. However, even when the first ventilation fan 46 is operated excessively, the air temperature of the attic AT does not become higher than an air temperature of the outdoor area 99, and electric energy consumption by the first ventilation fan 46 causes degradation in energy efficiency in the entire system. As in the cooling operation, consequently, the number of rotations of the first ventilation fan 46 is adjusted to have an appropriate value also in the heating operation, so that the energy efficiency is improved as compared with a case where the first ventilation fan 46 is driven at a constant number of rotations.

Figure 7:
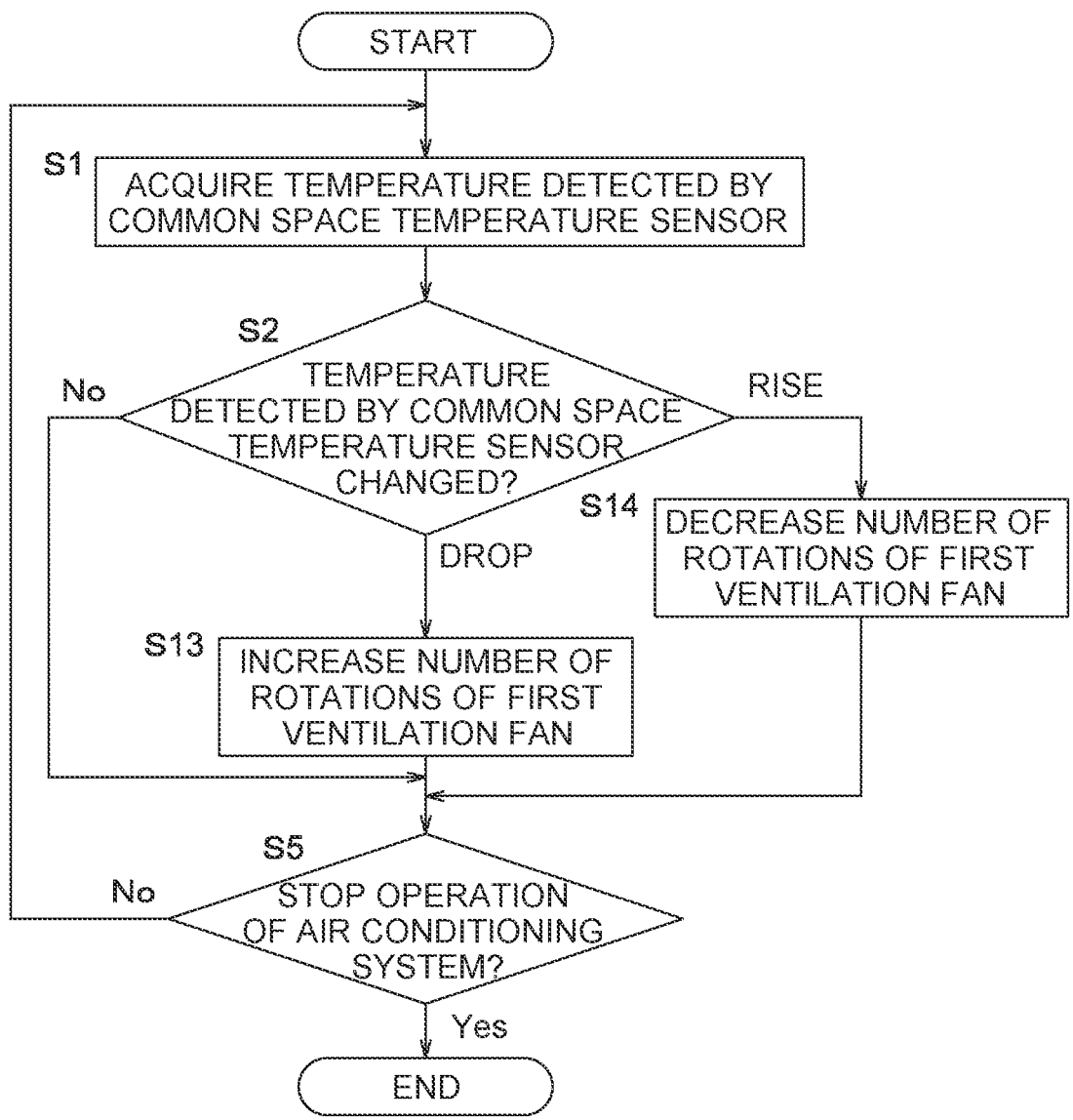
FIG. 7 is a flowchart of exemplary operation of the air conditioning system according to the first embodiment in a heating operation.

With reference to a flowchart of FIG. 7, next, a description will be given of a method of adjusting the number of rotations of the first ventilation fan 46, based on an air temperature of the attic AT, in the heating operation. In the heating operation, for example, when the number of rotations of the first ventilation fan 46 is smaller than the optimum value, cold air blown from each of the air conditioners 21 to 25 lowers the air temperature of the attic AT. In view of this, first, the controller 30 acquires a temperature detected by the common space temperature sensor 51 (step S1).

Next, the controller 30 makes a determination as to an adjustment to the number of rotations of the first ventilation fan 46, based on the temperature detected by the common space temperature sensor 51 (step S2). For example, when there is no change in air temperature of the attic AT by the end of a second interval set in advance, the controller 30 maintains the number of rotations of the first ventilation fan 46. The controller 30 is configured to detect the end of the second interval, using the clock 33. When there is no change in temperature detected by the common space temperature sensor 51, the processing proceeds to step S5. When the air temperature of the attic AT declines by the end of the second interval, the controller 30 increases the number of rotations of the first ventilation fan 46, in accordance with a decrease of the air temperature (step S13). The processing then proceeds to step S5. When the air temperature of the attic AT rises by the end of the second interval, the controller 30 decreases the number of rotations of the first ventilation fan 46, in accordance with an increase of the air temperature (step S14). The processing then proceeds to step S5. In step S5, the controller 30 determines whether to stop the operation of the air conditioning system 10. When the controller 30 makes a determination to continuously operate the air conditioning system 10, the processing returns to step S1. When the controller 30 makes a determination to stop the air conditioning system 10, then the controller 30 terminates the operation (steps S1 to S5) for adjusting the first ventilation fan 46. When the processing returns to step S1, the controller 30 returns to the beginning of the second interval.

(4) Modifications (4-1) Modification 1A

According to the first embodiment, the first ventilation fan 46 is an exhaust fan. Alternatively, the first ventilation fan 46 may be an intake fan. Still alternatively, the first ventilation fan 46 may function as an intake fan and an exhaust fan in a switchable manner.

(4-2) Modification 1B

Figure 8:
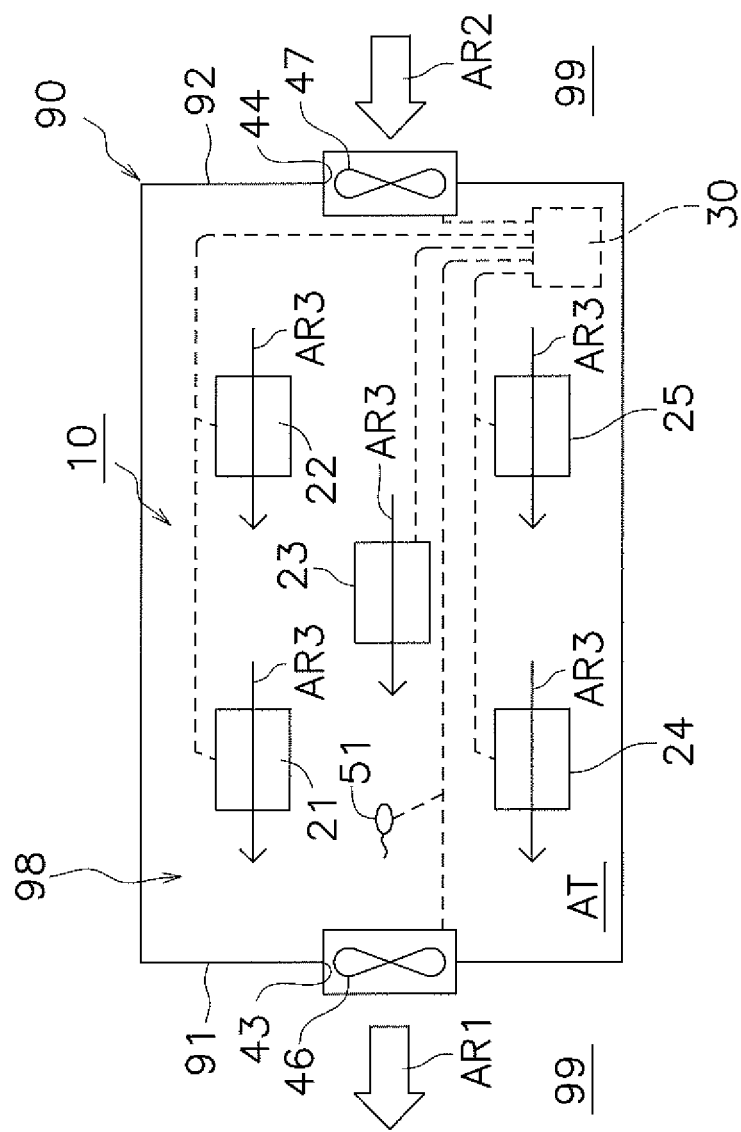
FIG. 8 is a conceptual view of a schematic configuration of an air conditioning system according to Modification 1B.

According to the first embodiment, only the first ventilation fan 46 is provided as a ventilation fan. Alternatively, the present invention is applicable to an air conditioning system including a plurality of ventilation fans. As illustrated in FIG. 8, for example, an air conditioning system 10 according to Modification 1B includes a first ventilation fan 46 and a second ventilation fan 47 mounted to an intake port 44. The second ventilation fan 47 is an intake fan that is controlled by a controller 30 and whose number of rotations is changeable. In the air conditioning system 10 according to Modification 1B, the controller 30 changes an airflow volume of each of the first ventilation fan 46 and the second ventilation fan 47 by changing the number of rotations of each of the first ventilation fan 46 and the second ventilation fan 47, based on a temperature detected by a common space temperature sensor 51, the temperature being information relating to an air temperature of an attic AT. Therefore, the air conditioning system 10 according to Modification 1B is capable of changing an airflow volume, by changing the number of ventilation fans to be driven.

(4-3) Modification 1C

In the air conditioning system 10 according to the first embodiment and the air conditioning system 10 according to Modification 1B, the airflow is fixedly directed from the intake port 44 to the exhaust port 43. Alternatively, the airflow may be directed in the reverse direction. For example, an air conditioning system 10 according to Modification 1C may include a first ventilation fan 46 and a second ventilation fan 47 of Modification 1B each serving as an exhaust fan and an intake fan in a switchable manner. In the air conditioning system 10 according to Modification 1C, when the first ventilation fan 46 serves as an intake fan and the second ventilation fan 47 serves as an exhaust fan, airflow is directed from the exhaust port 43 toward the intake port 44.

(4-4) Modification 1D

The air conditioning system 10 according to the first embodiment includes one common space temperature sensor 51. Alternatively, a plurality of temperature sensors may be disposed in the attic AT as the common space. In this case, for example, the controller 30 may make a determination based on a change in average value of temperatures detected by the temperature sensors. Alternatively, the controller 30 may weight temperatures detected by the temperature sensors and may make a determination based on a change in weighted average temperature. Still alternatively, the controller 30 may compare the number of temperature sensors whose detected temperatures increase, the number of temperature sensors whose detected temperatures are unchanged, and the number of temperature sensors whose detected temperatures decrease, and then make a determination based on the largest one of the numbers.

(4-5) Modification 1E

According to the first embodiment, the controller 30 controls the number of rotations of the first ventilation fan 46, thereby changing the air flow volume of the first ventilation fan 46. However, the method of changing the airflow volume is not limited to changing the number of rotations. For example, the air conditioning system 10 may include a plurality of ventilation fans. The controller 30 may change an airflow volume by changing the number of ventilation fans to be driven. Alternatively, the air conditioning system 10 may include a ventilation fan and a damper. The controller 30 may be configured to change a flow rate by controlling the damper, without changing the number of rotations of the ventilation fan.

Second Embodiment (5) General Configuration

An air conditioning system according to a second embodiment of the present invention is equal in configuration to, for example, the air conditioning system 10 according to the first embodiment illustrated in FIGS. 1 to 4. The air conditioning system 10 according to the second embodiment may be configured by changing the program stored in the memory 32 of the air conditioning system 10 according to the first embodiment. As to the air conditioning system 10 according to the second embodiment, the configuration is not described here, but the operation will be mainly described.

As already described in the first embodiment, as the number of operating air conditioners among air conditioners 21 to 25 is larger, an air temperature of an attic AT varies significantly. For example, when none of the air conditioners 21 to 25 operate, the air conditioners 21 to 25 cause no change in air temperature of the attic AT. When all the air conditioners 21 to 25 come to a stop, a controller 30 stops a first ventilation fan 46 such that the first ventilation fan 46 blows no air. In contrast, when all the air conditioners 21 to 25 operate, the air temperature of the attic AT varies most significantly. Hence, as the number of operating air conditioners among the air conditioners 21 to 25 is larger, the controller 30 sequentially increases an airflow volume of the first ventilation fan 46. In view of this, first, the controller 30 detects the number of currently operating air conditioners among the air conditioners 21 to 25. The controller 30 includes a memory 32 that stores therein in advance the number of rotations of the first ventilation fan 46 according to the number of operating air conditioners among the air conditioners 21 to 25. The controller 30 controls the first ventilation fan 46 in accordance with the number of operating air conditioners such that the first ventilation fan 46 rotates at a number of rotations stored in the memory 32. Specifically, the controller 30 employs the number of operating air conditioners among the air conditioners 21 to 25 as information relating to an air temperature of the attic AT as the common space, and changes the airflow volume of the first ventilation fan 46, based on the number of operating air conditioners. In this case, the first ventilation fan 46 may be configured to have five fan taps (first to fifth fan taps) in addition to a stop, and the number of rotations (airflow volume) may be switched in a stepwise manner such that the number of rotations in the first fan tap becomes smallest and the number of rotations in the fifth fan tap becomes largest.

(6) Modifications (6-1) Modification 2A

In the air conditioning system 10 according to the second embodiment, the airflow volume of the first ventilation fan 46 is changed based on only the number of operating air conditioners among the air conditioners 21 to 25. Alternatively, the controller 30 may employ, as the information relating to the air temperature of the attic AT as the common space, a combination of the number of operating air conditioners with information other than the number of operating air conditioners. An air conditioning system according to Modification 2A is equal in configuration to, for example, the air conditioning system 10 according to the first embodiment illustrated in FIGS. 1 to 4. In the air conditioning system 10 according to Modification 2A, a controller 30 may employ, as information relating to an air temperature of an attic AT, the number of operating air conditioners among air conditioners 21 to 25 and a temperature detected by a common space temperature sensor 51, and may change an airflow volume of a first ventilation fan 46, based on the information. The air conditioning system 10 according to Modification 2A may be configured by changing the program stored in the memory 32 of the air conditioning system 10 according to the first embodiment, for example.

Figure 9:
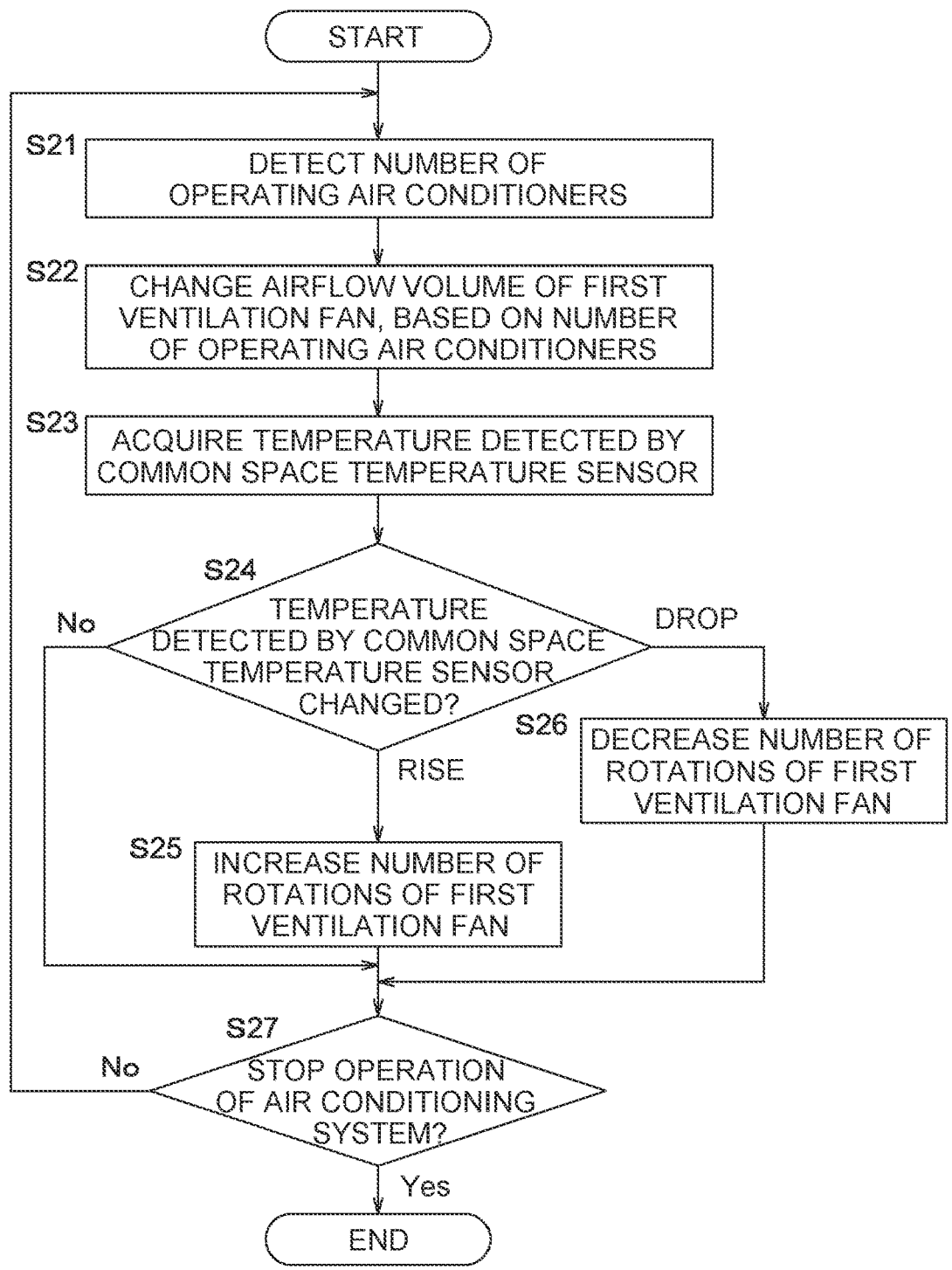
FIG. 9 is a flowchart of exemplary operation of an air conditioning system according to Modification 2A in a cooling operation.

With reference to FIG. 9, next, a description will be given of exemplary operation of the air conditioning system 10 according to Modification 2A. FIG. 9 illustrates the operation of the air conditioning system 10 in a cooling operation. First, the controller 30 detects the number of operating air conditioners among the air conditioners 21 to 25 (step S21). Next, the controller 30 sets the number of rotations of the first ventilation fan 46, based on the number of operating air conditioners among the air conditioners 21 to 25, and changes the airflow volume of the first ventilation fan 46 (step S22). The controller 30 acquires a temperature detected by the common space temperature sensor 51 after a lapse of a first interval (step S23). The controller 30 makes a determination as to a necessity of an adjustment to the number of rotations of the first ventilation fan 46, in accordance with the temperature detected by the common space temperature sensor 51 (step S24). For example, when there is no change in air temperature of the attic AT by the end of the first interval, the controller 30 maintains the number of rotations of the first ventilation fan 46. Therefore, when there is no change in temperature detected by the common space temperature sensor 51, the processing proceeds to step S27. When the air temperature of the attic AT rises by the end of the first interval, the controller 30 increases the number of rotations of the first ventilation fan 46, in accordance with an increase of the air temperature (step S25). The processing then proceeds to step S27. When the air temperature of the attic AT declines by the end of the first interval, the controller 30 decreases the number of rotations of the first ventilation fan 46, in accordance with a decrease of the air temperature (step S26). The processing then proceeds to step S27. In step S27, the controller 30 determines whether to stop the operation of the air conditioning system 10. When the controller 30 makes a determination to continuously operate the air conditioning system 10, the processing returns to step S21. When the controller 30 makes a determination to stop the air conditioning system 10, then the controller 30 terminates the operation (steps S21 to S27) for adjusting the first ventilation fan 46. When the processing returns to step S21, the controller 30 returns to the beginning of the first interval.

(6-2) Modification 2B

Figure 10:
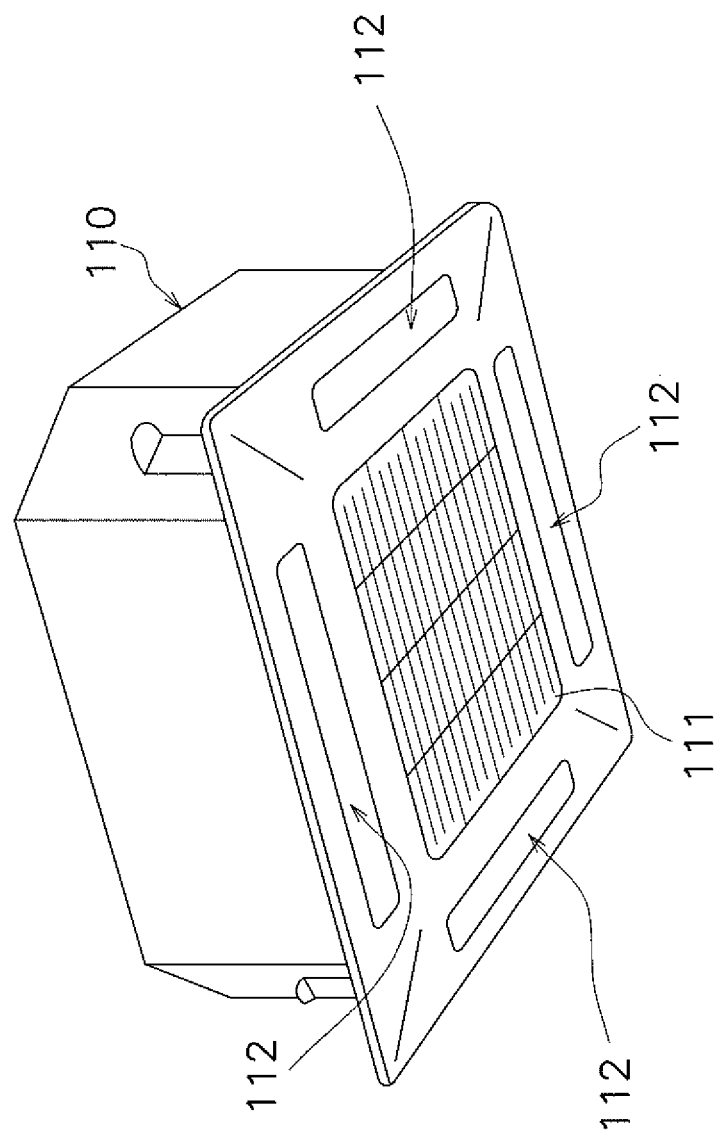
FIG. 10 is a perspective view of an exemplary appearance of a first casing in a separate air conditioner constituting an air conditioning system according to Modification 2B.
Figure 11:
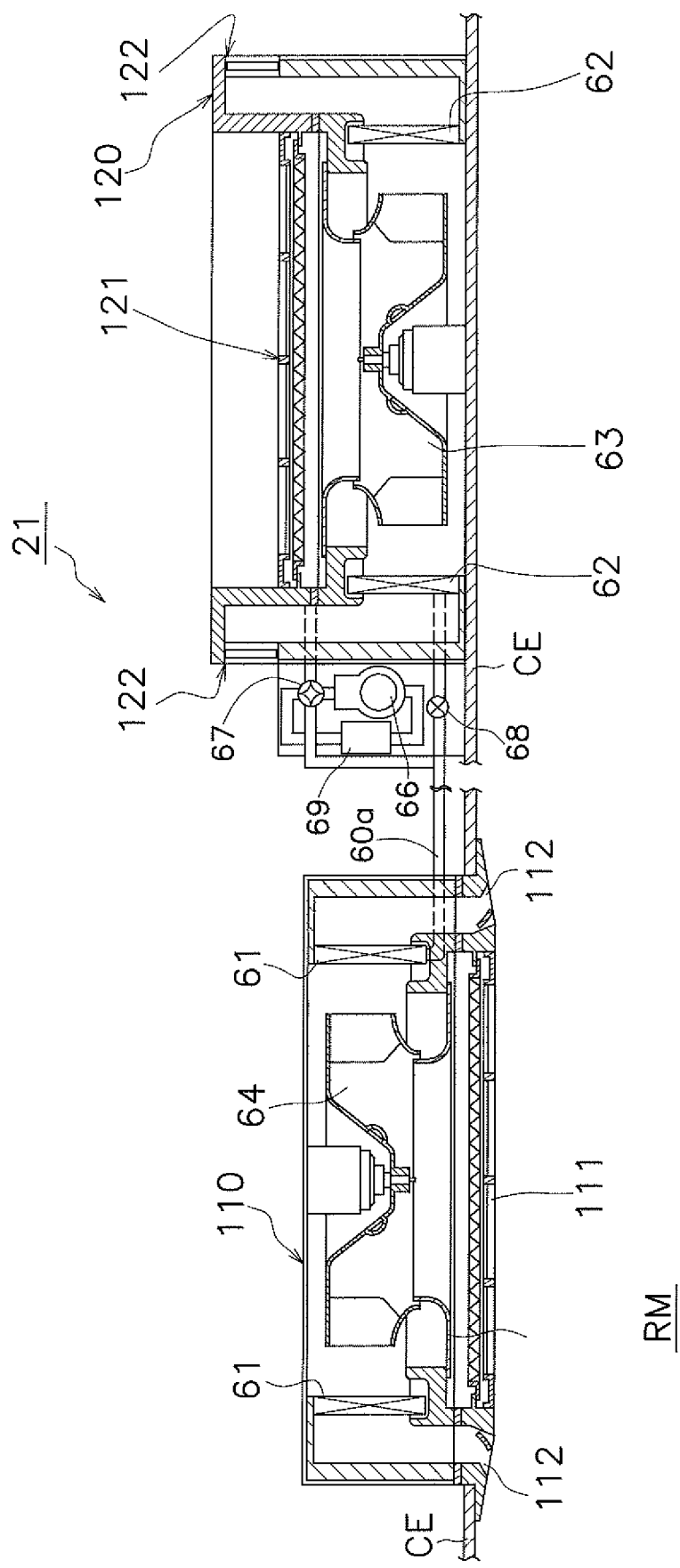
FIG. 11 is a schematic sectional view of the air conditioner illustrated in FIG. 10.

According to the first embodiment, Modifications 1A to 1D of the first embodiment, the second embodiment, and Modification 2A of the second embodiment, each of the air conditioners 21 to 25 is of a unitary type. Alternatively, each of the air conditioners 21 to 25 may be of a separate type. FIGS. 10 and 11 each illustrate a separate air conditioner 21. The separate air conditioner 21 is different from the unitary air conditioner 21 in the following points. The unitary air conditioner 21 includes one casing 65 whose internal space is divided by the partition plate 65a, whereas the separate air conditioner 21 includes a first casing 110 and a second casing 120 that are separate from each other. The first casing 110 that is exposed to a room RM has a room-side intake port 111 through which air in the room RM is taken in, and a room-side blow-out port 112 through which air is blown into the room RM. The second casing 120 that is exposed to an attic AT has a common space-side intake port 121 through which air in the attic AT is taken in, and a common space-side blow-out port 122 through which air is blown into the attic AT. As illustrated in FIG. 11, the air conditioner 21 may include a heat source-side fan 63 and a usage-side fan 64 each of which is a centrifugal fan. The air conditioner 21 may also include a usage-side heat exchanger 61 formed in a quadrangular ring shape so as to surround the heat source-side fan 63, and a heat source-side heat exchanger 62 formed in a quadrangular ring shape so as to surround the usage-side fan 64. For example, the usage-side heat exchanger 61 is formed in a quadrangular ring shape with four sides disposed in correspondence with four room-side blow-out ports 112 illustrated in FIG. 10.

In the example of FIG. 11, one air conditioner 21 enables heat transfer between one heat source-side heat exchanger 62 and one usage-side heat exchanger 61. Alternatively, one air conditioner 21 may be configured to carry out heat transfer between one heat source-side heat exchanger 62 and a plurality of usage-side heat exchangers 61 in such a manner that the air conditioner 21 includes a plurality of first casings 110 and a plurality of components housed in each first casing 110. The operation of the air conditioner including the plurality of usage-side heat exchangers 61, for example, the operation of the air conditioner that enables heat transfer between one heat source-side heat exchanger 62 and two usage-side heat exchangers 61 may be different in degree of weighting from the operation of the air conditioner that enables heat transfer between one heat source-side heat exchanger 62 and one usage-side heat exchanger 61. For example, the controller 30 may increase the airflow volume of the first ventilation fan 46 by one tap when the number of operating air conditioners each enabling heat transfer between one heat source-side heat exchanger 62 and one usage-side heat exchanger 61 increases by one. On the other hand, the controller 30 may increase the airflow volume by two taps when the number of operating air conditioners each enabling heat transfer between one heat source-side heat exchanger 62 and two usage-side heat exchangers 61 increases by one.

Likewise, the weighting may be made based on air conditioning capacities of the air conditioners 21 to 25. It is assumed herein that the air conditioner 21 is larger in air conditioning capacity than the air conditioner 22. In such a case, the airflow volume to be increased when the air conditioner 21 having the larger air conditioning capacity is operated may be higher than the airflow volume to be increased when the air conditioner 22 having the smaller air conditioning capacity is operated. The air conditioning capacity corresponds to a cooling capacity in the cooling operation and a heating capacity in the heating operation, and refers to a capacity as to how much heat energy can be removed from or given to an air-conditioning target space within a certain period of time. As the air conditioning capacity is larger, greater heat energy can be removed from or given to the air-conditioning target space.

Third Embodiment (7) General Configuration

An air conditioning system according to a third embodiment of the present invention is equal in configuration to, for example, the air conditioning system 10 according to the first embodiment illustrated in FIGS. 1 to 4. The air conditioning system 10 according to the third embodiment may be configured by changing the program stored in the memory 32 of the air conditioning system 10 according to the first embodiment. As to the air conditioning system 10 according to the third embodiment, the configuration is not described here, but the operation will be mainly described.

The air conditioning system 10 according to the third embodiment includes air conditioners 21 to 25, and a controller 30 configured to input set temperatures to the air conditioners 21 to 25 independently of one another. It is considered herein that the air conditioners 21 to 25 are equal in set temperature to one another, and a temperature of a room RM rises in the vicinity of a west wall 91 at dusk since sunlight directly hits on the west wall 91 at dusk. It is assumed herein that, in a cooling operation, the air conditioners 21 and 23 are operated, each of the set temperatures of the air conditioners 21 and 23 is 27° C., a temperature of air to be sucked into the air conditioner 21 from the room RM is 29° C., and a temperature of air to be sucked into the air conditioner 23 from the room RM is 28° C., and an air temperature of an attic AT is 32° C. The controller 30 detects the temperature of the air to be sucked by the air conditioner 21, using a temperature sensor 72 of the air conditioner 21, and also detects the temperature of the air to be sucked into the air conditioner 23, using a temperature sensor 72 of the air conditioner 23. Since the air temperature of the attic AT corresponds to the temperature of the air to be sucked into each of the air conditioners 21 and 23, the controller 30 detects the air temperature of the attic AT, using temperature sensors 71 of the air conditioners 21 and 23. In addition, the controller 30 obtains a fact that the air conditioners 21 and 23 are operated and the set temperature of each of the air conditioners 21 and 23 is 27° C., from control units 21a and 23a of the air conditioners 21 and 23. Using the information, the controller 30 calculates a processing load of each of the air conditioner 21 and the air conditioner 23, and changes an airflow volume of the first ventilation fan 46, based on the calculated processing loads.

In the air conditioning system 10 according to the second embodiment, the airflow volume of the first ventilation fan 46 is changed based on the number of operating air conditioners. In the state described above, therefore, a change in airflow volume of the first ventilation fan 46 on condition that the operation of the air conditioner 21 comes to a stop is equal to a change in airflow volume of the first ventilation fan 46 on condition that the operation of the air conditioner 23 comes to a stop. In the air conditioning system 10 according to the third embodiment, on the other hand, the processing load of the air conditioner 21 is large in the case described above. Therefore, the change in airflow volume on condition that the operation of the air conditioner 21 comes to a stop is made larger than the change in airflow volume on condition that the operation of the air conditioner 23 comes to a stop. Consequently, the air conditioning system 10 according to the third embodiment enables a more finer adjustment to an airflow volume as compared with the air conditioning system 10 according to the second embodiment. The foregoing description concerns the case where the air to be sucked into the air conditioner 21 is different in temperature from the air to be sucked into the air conditioner 23. However, when the air conditioners 21 to 25 are different in set temperature from one another, the air conditioners 21 to 25 are different in processing load from one another even at the same temperature of air to be sucked into each air conditioner. Therefore, the air conditioning system 10 according to the third embodiment enables a more finer adjustment to the airflow volume of the first ventilation fan 46 even when the air conditioners 21 to 25 are different in processing load from one another. The foregoing description concerns the cooling operation. Also in the heating operation, the controller 30 calculates a processing load of each of the air conditioners 21 to 25, and changes an airflow volume of the first ventilation fan 46, based on the calculated processing loads. Advantageous effects similar to those in the cooling operation are therefore produced in the heating operation.

(8) Modifications (8-1) Modification 3A

In the air conditioning system 10 according to the third embodiment, the airflow volume of the first ventilation fan 46 is changed based on only the processing loads of the air conditioners 21 to 25. Alternatively, the controller 30 may employ, as the information relating to the air temperature of the attic AT as the common space, a combination of a processing load of an air conditioner with information other than the processing load. An air conditioning system according to Modification 3A is equal in configuration to, for example, the air conditioning system 10 according to the first embodiment illustrated in FIGS. 1 to 4. In the air conditioning system 10 according to Modification 3A, a controller 30 may employ, as information relating to an air temperature of an attic AT, processing loads of air conditioners 21 to 25 and a temperature detected by a common space temperature sensor 51, and may change an airflow volume of a first ventilation fan 46, based on the information. The air conditioning system 10 according to Modification 3A may be configured by changing the program stored in the memory 32 of the air conditioning system 10 according to the first embodiment.

Figure 12:
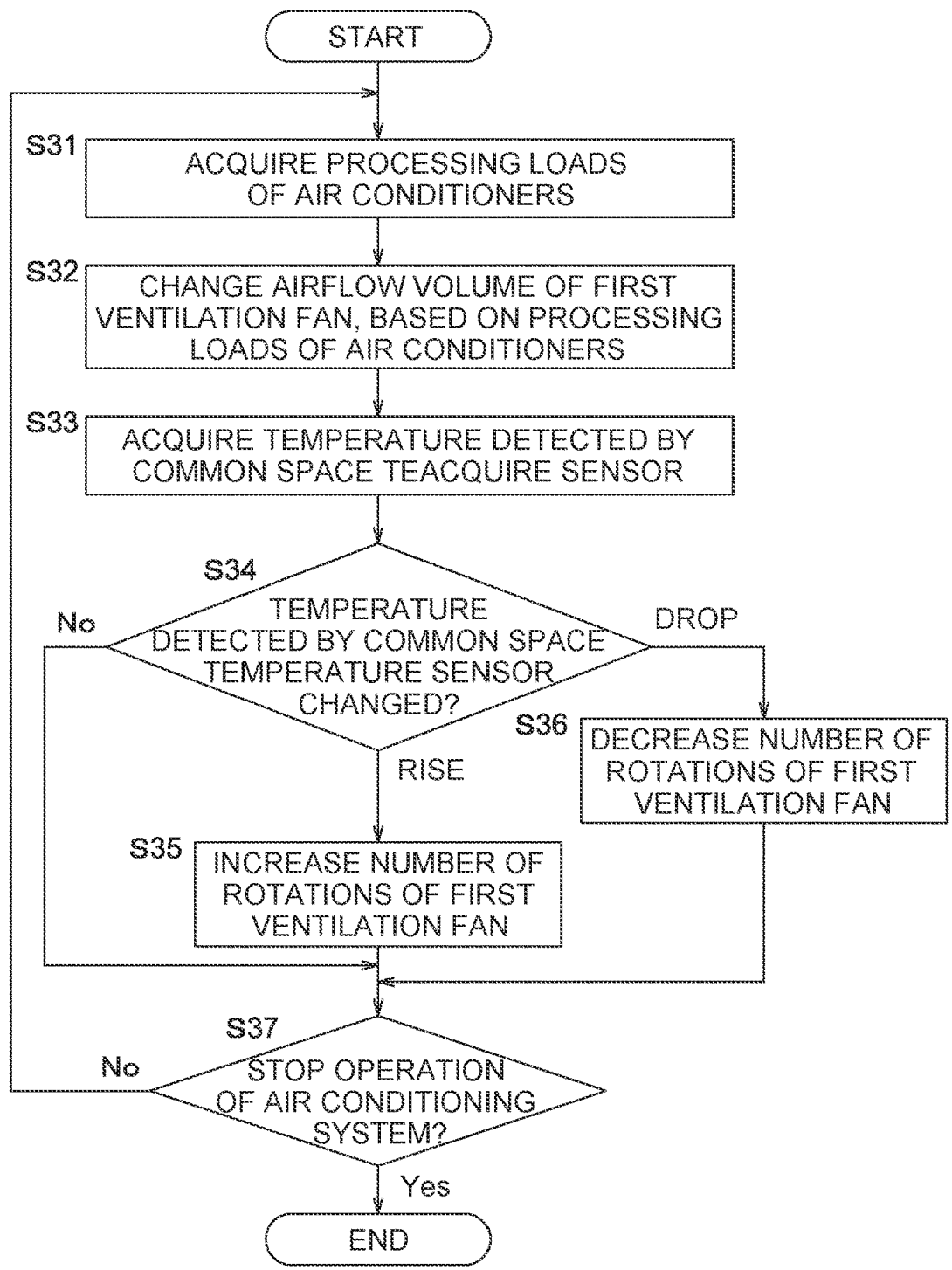
FIG. 12 is a flowchart of exemplary operation of an air conditioning system according to Modification 3A in a cooling operation.

With reference to FIG. 12, next, a description will be given of exemplary operation of the air conditioning system 10 according to Modification 3A. FIG. 12 illustrates the operation of the air conditioning system 10 in a cooling operation. First, the controller 30 receives data for calculating processing loads from control units 21a to 25a of the air conditioners 21 to 25 to acquire the processing loads of air conditioners 21 to 25 (step S31). Next, the controller 30 sets the number of rotations of a first ventilation fan 46 based on the processing loads of the air conditioners 21 to 25, and changes the airflow volume of the first ventilation fan 46 (step S32). The controller 30 acquires a temperature detected by a common space temperature sensor 51 after a lapse of a third interval (step S33). Next, the controller 30 makes a determination as to an adjustment to the number of rotations of the first ventilation fan 46, based on the temperature detected by the common space temperature sensor 51 (step S34). For example, when there is no change in air temperature of an attic AT by the end of the third interval, the controller 30 maintains the number of rotations of the first ventilation fan 46. Therefore, when there is no change in temperature detected by the common space temperature sensor 51, the processing proceeds to step S37. When the air temperature of the attic AT rises by the end of the third interval, the controller 30 increases the number of rotations of the first ventilation fan 46, in accordance with an increase of the air temperature (step S35). The processing then proceeds to step S37. When the air temperature of the attic AT declines by the end of the third interval, the controller 30 decreases the number of rotations of the first ventilation fan 46, in accordance with a decrease of the air temperature (step S36). The processing then proceeds to step S37. In step S37, the controller 30 determines whether to stop the operation of the air conditioning system 10. When the controller 30 makes a determination to continuously operate the air conditioning system 10, the processing returns to step S31. When the controller 30 makes a determination to stop the air conditioning system 10, then the controller 30 terminates the operation (steps S31 to S37) for adjusting the first ventilation fan 46. When the processing returns to step S31, the controller 30 returns to the beginning of the third interval.

(8-2) Modification 3B

According to the third embodiment and Modification 3A, all the air conditioners 21 to 25 perform the cooling operation, or all the air conditioners 21 to 25 perform the heating operation. Alternatively, the air conditioners 21, 23, and 24 may perform the cooling operation, and the air conditioners 22 and 25 may perform the heating operation. In such a case, for example, the controller 30 may calculate the number of operating air conditioners by addition with reversing positive and negative signs depending on air conditioners different in operation from one another. The total number of operating air conditioners may be regarded to be equivalent to one (i.e., one air conditioner performing the cooling operation) since three air conditioners perform the cooling operation and two air conditioners perform the heating operation.

Fourth Embodiment (9) General Configuration

Figure 13:
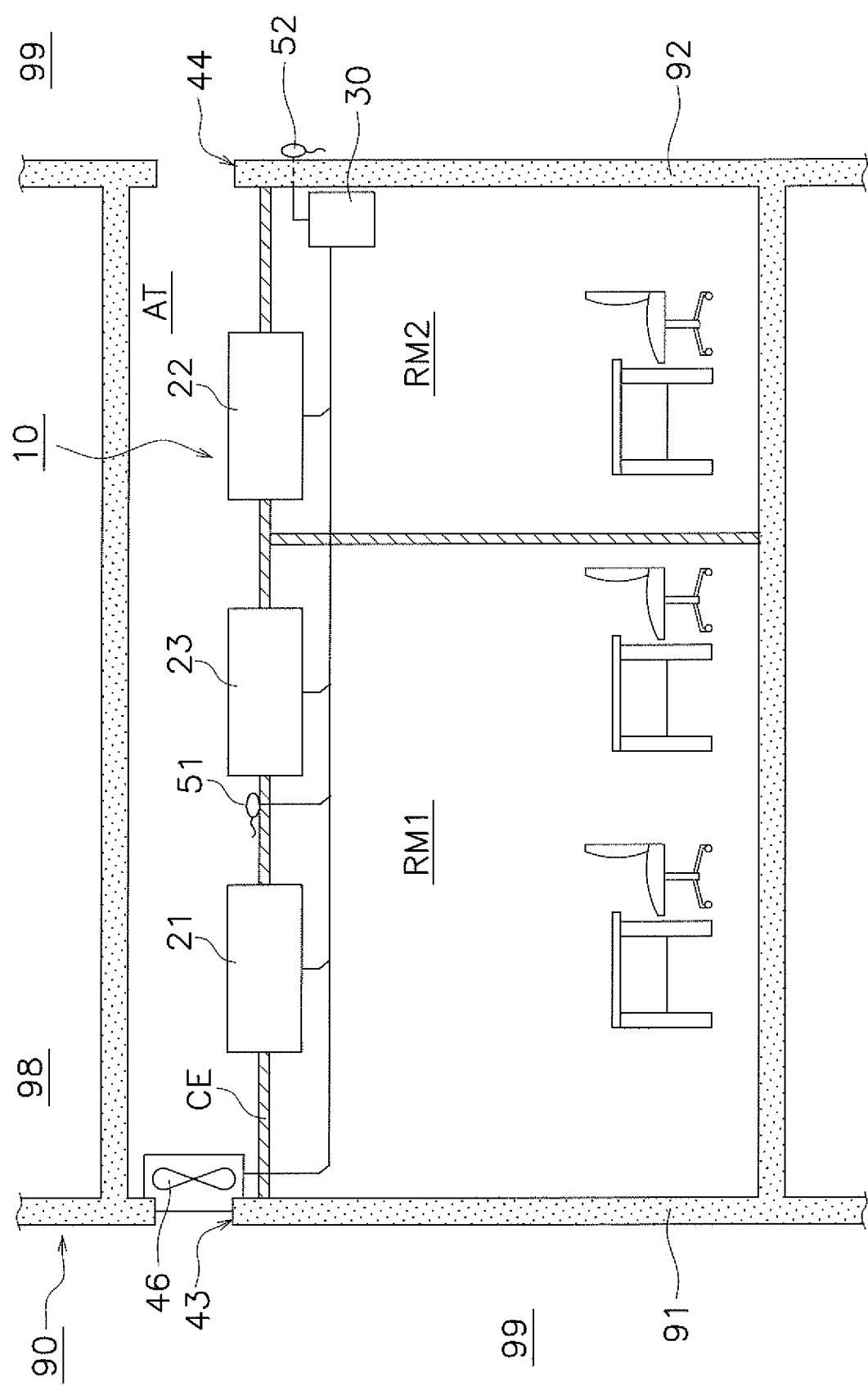
FIG. 13 is a schematic sectional view of a building in which an air conditioning system according to a fourth embodiment is installed.

As illustrated in FIG. 13, an air conditioning system according to a fourth embodiment of the present invention is equal in configuration to, for example, the air conditioning system 10 according to the first embodiment illustrated in FIGS. 1 to 4. In each of the air conditioning systems 10 according to the first embodiment, Modifications 1A to 1D, the second embodiment, Modifications 2A and 2B, the third embodiment, and Modification 3A, the controller 30 does not set a target temperature as to an air temperature of the attic AT for the purpose of controlling the air temperature of the attic AT. In the air conditioning system 10 according to the fourth embodiment, a controller 30 sets a target temperature, and performs feedback control. Specifically, the controller 30 compares an actual temperature of an attic AT with a target temperature of the attic AT, and changes an airflow volume of a first ventilation fan 46 such that the actual temperature of a common space becomes equal to the target temperature of the common space. The air conditioning system 10 according to the fourth embodiment therefore includes an outdoor temperature sensor 52 configured to measure an air temperature of an outdoor area 99. As illustrated in FIG. 13, a room as an air-conditioning target space may be divided into a first room RM1 and a second room RM2.

It is apparent from the description on the air conditioning system 10 according to the third embodiment that an air temperature of the attic AT tends to vary as a processing load is larger. In a cooling operation, an air temperature of the attic AT is apt to rise as a processing load is larger. In a heating operation, an air temperature of the attic AT is apt to decline as a processing load is larger. Even when air conditioners are equal in processing load to one another, a difference between an air temperature of the outdoor area 99 and an air temperature of the attic AT causes a difference in degree of suppressing a temperature change although the first ventilation fan 46 is controlled to supply air in a fixed airflow volume. For example, on condition that the attic AT has an air temperature of 34° C. in the cooling operation, a temperature change suppressing effect in a case where the outdoor area 99 has an air temperature of 30° C. is greater than that in a case where the outdoor area 99 has an air temperature of 32° C.

A volumetric capacity of the attic AT also causes a difference in temperature change suppression. This is because the first ventilation fan 46 controlled to supply air in a fixed airflow volume allows ventilation of the attic AT in a short time when the volumetric capacity of the attic AT is small, but requires much time for ventilation of the attic AT as the volumetric capacity of the attic AT is larger. Hence, an appropriate target temperature as to an air temperature of a specific attic AT is set in advance to an air temperature of the outdoor area 99 and a processing load, by experiments and simulations conducted while changing an air temperature of the outdoor area 99 and a processing load. A memory 32 of the controller 30 stores therein a relationship between the target temperature and each of the air temperature of the outdoor area 99 and the processing load. The air conditioning system 10 according to the fourth embodiment employs, as information relating to the target temperature of the common space, the target temperature read from the memory 32 with the air temperature of the outdoor area 99 and the processing load. The air conditioning system 10 according to the fourth embodiment also employs, as the information relating to the actual temperature of the common space, a temperature to be detected by a common space temperature sensor 51. The controller 30 compares the temperature detected by the common space temperature sensor 51, the temperature being the information relating to the actual temperature of the attic AT, with the target temperature of the attic AT. The controller 30 then changes the airflow volume of the first ventilation fan 46 such that the temperature detected by the common space temperature sensor 51, that is, the actual temperature of the attic AT becomes equal to the target temperature. In the fourth embodiment, the number of common space temperature sensors 51 is one. Alternatively, the air conditioning system 10 may include a plurality of common space temperature sensors. For example, the air conditioning system 10 may employ, as an air temperature of a common space, an average value of temperatures detected by the common space temperature sensors or a weighted average temperature.

Figure 14:
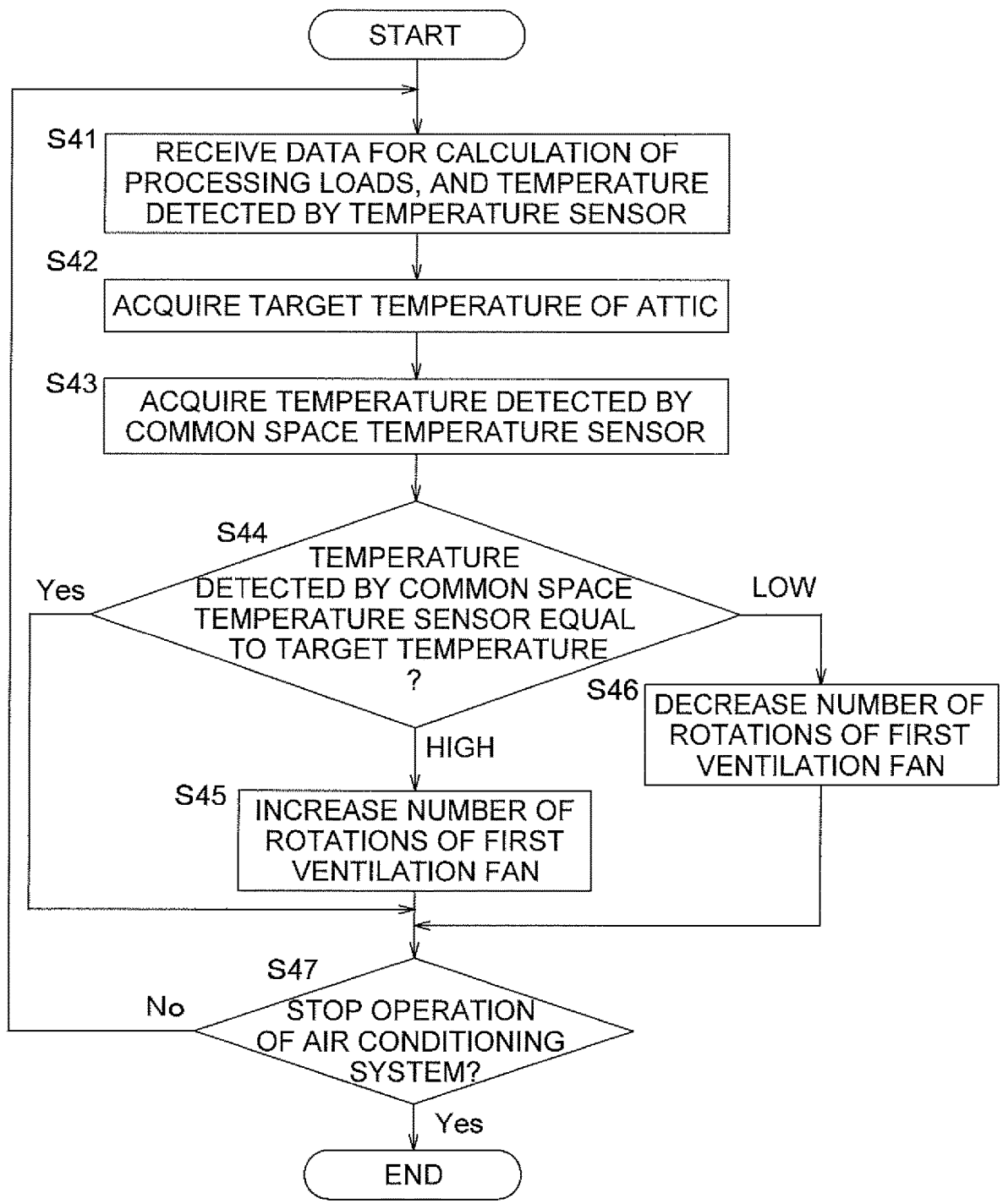
FIG. 14 is a flowchart of exemplary operation of the air conditioning system according to the fourth embodiment in a cooling operation.

With reference to FIG. 14, next, a description will be given of exemplary operation of the air conditioning system 10 according to the fourth embodiment. FIG. 14 illustrates the operation of the air conditioning system 10 in the cooling operation. First, the controller 30 receives data for calculating processing loads of air conditioners 21 to 25 from control units 21*a* to 25*a* of the air conditioners 21 to 25, and also receives a temperature detected by the outdoor temperature sensor 52 from the outdoor temperature sensor 52 (step S41). The controller 30 calculates the processing loads of the air conditioners 21 to 25 to acquire a target temperature (step S42). The controller 30 acquires a temperature detected by the common space temperature sensor 51 after a lapse of a fourth interval (step S43). Next, the controller 30 makes a determination as to an adjustment to the number of rotations of the first ventilation fan 46, based on the temperature detected by the common space temperature sensor 51 (step S44). When the temperature detected by the common space temperature sensor 51 is equal to the target temperature as to an air temperature of the attic AT in the fourth interval, the controller 30 maintains the number of rotations of the first ventilation fan 46. Therefore, when the detected temperature is equal to the target temperature, the processing proceeds to step S37. When the detected temperature is higher than the target temperature at the end of the fourth interval, the controller 30 increases the number of rotations of the first ventilation fan 46, in accordance with a difference between the detected temperature and the target temperature (step S45). The processing then proceeds to step S47. When the detected temperature is lower than the target temperature at the end of the fourth interval, the controller 30 decreases the number of rotations of the first ventilation fan 46, in accordance with a difference between the detected temperature and the target temperature (step S46). The processing then proceeds to step S47. In step S47, the controller 30 determines whether to stop the operation of the air conditioning system 10. When the controller 30 makes a determination to continuously operate the air conditioning system 10, the processing returns to step S41. When the controller 30 makes a determination to stop the air conditioning system 10, then the controller 30 terminates the operation (steps S41 to S47) for adjusting the first ventilation fan 46. When the processing returns to step S41, the controller 30 returns to the beginning of the fourth interval. As described above, the controller 30 performs the operation (steps S41 to S47) for adjusting the first ventilation fan 46, thereby performing the feedback control to change the airflow volume of the first ventilation fan 46 such that the actual temperature of the common space becomes equal to the target temperature of the common space.

(10) Modifications (10-1) Modification 4A

The air conditioning system 10 according to the fourth embodiment employs, as the information relating to the target temperature, the air temperature of the outdoor area 99 and the processing loads of the air conditioners 21 to 25; however, the information relating to the target temperature is not limited thereto. For example, the processing loads of the air conditioners 21 to 25 may be replaced with the number of operating air conditioners among the air conditioners 21 to 25. An air conditioning system 10 according to Modification 4A is equal in configuration to, for example, the air conditioning system 10 according to the fourth embodiment illustrated in FIG. 13. For example, an appropriate target temperature as to an air temperature of a specific attic AT is set in advance to the air temperature of the outdoor area 99 and the number of operating air conditioners, by experiments and simulations conducted while changing the air temperature of the outdoor area 99 and the number of operating air conditioners. In this case, the controller 30 receives a temperature detected by the common space temperature sensor 51 and the number of operating air conditioners among the air conditioners 21 to 25 in step S41 of FIG. 14. In step S42, the controller 30 acquires the target temperature of the attic AT from the detected temperature and the number of operating air conditioners. In steps S43 to S47, the controller 30 of the air conditioning system 10 according to Modification 4A operates as in the controller 30 of the air conditioning system 10 according to the fourth embodiment.

(10-2) Modification 4B

In the air conditioning system 10 according to the fourth embodiment, the controller 30 performs the feedback control. Alternatively, the controller 30 may be configured to acquire information relating to prospective air temperatures relevant to the air conditioners 21 to 25 in the attic AT, and the air conditioning system 10 may be configured to perform feedforward control to correct the change in airflow volume of the first ventilation fan 46, based on the information relating to the prospective air temperature of the attic AT. An air conditioning system 10 according to Modification 4B may be configured by changing the program stored in the memory 32 of the air conditioning system 10 according to the fourth embodiment.

The information relating to the prospective air temperature of the attic AT may be information on an operating schedule of the air conditioning system 10. For example, the air conditioning system 10 installed in an office or store in a building automatically starts to perform a heating operation at 7:00 a.m. in business days during the winter months. Typically, the first ventilation fan 46 is driven immediately when the air conditioning system 10 starts to operate. However, if the controller 30 previously has information that the attic AT is higher in air temperature than the outdoor area 99 at 7:00 a.m., the controller 30 may correct the change in airflow volume of the first ventilation fan 46 so as to stop the first ventilation fan 46 until a predetermined standby time elapses from 7:00 a.m. at which the air conditioning system 10 starts to operate.

(10-3) Modification 4C

According to the fourth embodiment and Modifications 4A and 4B, all the air conditioners 21 to 25 perform the cooling operation, or all the air conditioners 21 to 25 perform the heating operation. Alternatively, the air conditioners 21, 23, and 24 may perform the cooling operation, and the air conditioners 22 and 25 may perform the heating operation. In such a case, for example, the controller 30 may calculate the number of operating air conditioners and the processing load by addition with reversing positive and negative signs depending on air conditioners different in operation from one another. For example, a total amount of processing load ΣL is obtained from |L1−L2+L3+L4−L5| where L1 to L5 respectively represent the processing loads of the air conditioners 21 to 25. In addition, the total number of operating air conditioners may be regarded to be equivalent to one (i.e., one air conditioner performing the cooling operation) since three air conditioners perform the cooling operation and two air conditioners perform the heating operation.

Fifth Embodiment

(11) General Configuration

Figure 15:
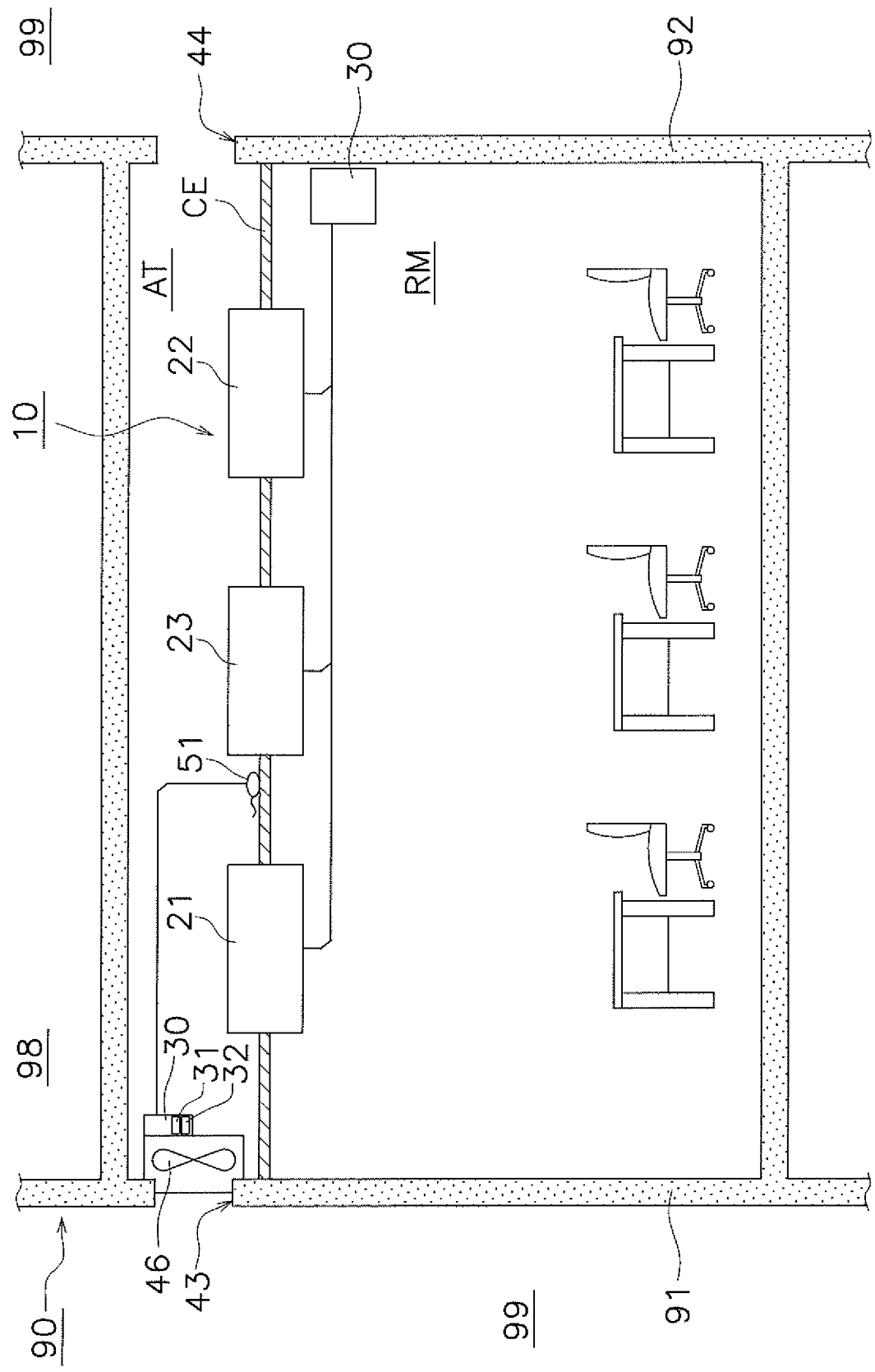
FIG. 15 is a schematic sectional view of a building in which an air conditioning system according to a fifth embodiment is installed.

In the foregoing embodiments and modifications, the controller 30 intensively controls the number of rotations of the ventilation fan. Alternatively, the ventilation fan may include an independent control unit configured to perform autonomous distributed control. In an air conditioning system 10 according to a fifth embodiment, for example, a first ventilation fan 46 may include a controller 30 including an MPU 31 and a memory 32, and may be configured to receive a temperature detected by a common space temperature sensor 51 (see FIG. 15). The controller 30 may be similar in configuration to the controller 30 described in the first embodiment. As illustrated in FIG. 15, in the air conditioning system 10 according to the fifth embodiment, a controller included in the ventilation fan compares an air temperature of an outdoor area 99 with an air temperature of an attic AT, and changes an airflow volume thereof by changing the number of rotations thereof in accordance with a difference between the air temperature of the outdoor area 99 and the air temperature of the attic AT. For example, the controller 30 included in the first ventilation fan 46 (see FIG. 15) may carry out steps S1 to S5 of FIG. 6. In step S5, the controller 30 may make a determination based on detection of an interruption of driving power to the first ventilation fan 46.

(12) Features (12-1)

In the air conditioning system 10, the heat source-side heat exchangers 62 of the air conditioners 21 to 25 are disposed in the attic AT as the common space. The controller 30 as the control device changes the airflow volume of the first ventilation fan 46, based on the information relating to the air temperature of the attic AT, thereby changing a flow rate of air to be taken in through the intake port 44 and a flow rate of air to be discharged through the exhaust port 43. The controller 30 thus adjusts the air temperature of the attic AT. Examples of the information relating to the air temperature of the attic AT may include: a measured value of the air temperature of the attic AT (e.g., a temperature detected by the common space temperature sensor 51 or an average value of temperatures detected by the common space temperature sensors) (refer to the first embodiment, Modifications 1A to 1C, 1E, the fifth embodiment); temperatures detected by the temperature sensors as to the air temperature of the attic AT (e.g., a temperature detected by the common space temperature sensor 51 and a temperature detected by the outdoor temperature sensor 52) (refer to Modification 1D); the number of operating air conditioners among the air conditioners 21 to 25 (refer to the second embodiment); a combination of a measured value of the air temperature of the attic AT (e.g., a temperature detected by the common space temperature sensor 51) and the number of operating air conditioners among the air conditioners 21 to 25 (refer to Modification 2A); the weighted number of operating air conditioners among the air conditioners 21 to 25 or a combination of the weighted number of operating air conditioners among the air conditioners 21 to 25 and a measured value of the air temperature of the attic AT (refer to Modification 2B); the processing loads of the air conditioners 21 to 25 (refer to the third embodiment); a combination of a measured value of the air temperature of the attic and the processing loads of the air conditioners 21 to 25 (refer to Modification 3A); and a combination of a measured value of the air temperature of the attic AT (e.g., a temperature detected by the common space temperature sensor 51) and data for obtaining the target temperature of the attic AT (refer to the fourth embodiment, Modifications 4A to 4C). In addition, the common space is not limited to the attic AT. For example, the common space may be an open hall connecting between the attics of upper and lower floors in a building, or a clearance between two walls of adjoining rooms.

For example, a change in total amount of heat exchange by the air conditioners 21 to 25 and a change in air temperature of the outdoor area 99 in the vicinity of the intake port occasionally cause a change in air temperature of the attic AT. In such a case, the controller 30 increases the airflow volume of the first ventilation fan 46 as long as improvement in efficiency of the air conditioners 21 to 25 is obtained and consequently improvement in efficiency of the entire air conditioning system 10 is obtained even when an amount of electric power to be consumed by the first ventilation fan 46 is increased. In addition, the controller 30 decreases the airflow volume of the first ventilation fan 46 to reduce an amount of electric power to be consumed by the first ventilation fan 46 as long as improvement in efficiency of the air conditioners 21 to 25 is obtained and consequently improvement in efficiency of the entire air conditioning system 10 is obtained even when the airflow volume of the first ventilation fan 46 is decreased. As described above, the air conditioning system 10 suppresses energy consumption by efficient shared use of air in the attic AT as the common space among the air conditioners 21 to 25 for the purpose of heat exchange.

(12-2)

As described in the first embodiment, Modifications 1A to 1E, Modification 2A, Modification 3A, the fourth embodiment, Modification 4A, and the fifth embodiment, one temperature sensor (the common space temperature sensor 51) or a plurality of temperature sensors (the common space temperature sensor 51 and the outdoor temperature sensor 52) enable detection of an actual air temperature of the attic AT. The controller 30 changes the airflow volume of the first ventilation fan 46 or the airflow volumes of the first and second ventilation fans 46 and 47 while determining whether the actual air temperature of the attic AT is efficiently sharable among the air conditioners 21 to 25 for the purpose of heat exchange. The air conditioning system 10 consequently enables accurate control in accordance with a situation of the attic AT.

(12-3)

As described in the second embodiment and Modification 2A, the controller 30 as the control device changes the airflow volume of the first ventilation fan 46, based on the number of operating air conditioners among the air conditioners 21 to 25. Therefore, the controller 30 increases the airflow volume of the first ventilation fan 46 to suppress the change in air temperature of the attic AT if the air temperature of the attic AT is apt to change so as to degrade the heat exchange efficiency of the air conditioners 21 to 25 since the number of operating air conditioners is large. In addition, the controller 30 decreases the airflow volume of the first ventilation fan 46 to reduce an amount of electric power to be consumed by the first ventilation fan 46 if the air temperature of the attic AT is less prone to change so as to degrade the heat exchange efficiency of the air conditioners 21 to 25 since the number of operating air conditioners among the air conditioners 21 to 25 is small. As described above, the air conditioning system 10 improves its entire energy efficiency while suppressing an increase in burden on the controller 30.

(12-4)

As described in the third embodiment and Modification 3A, the controller 30 changes the airflow volume of the first ventilation fan 46, based on the processing loads of the air conditioners 21 to 25. Therefore, the controller 30 increases the airflow volume of the first ventilation fan 46 to suppress the change in air temperature of the attic AT if the air temperature of the attic AT is apt to change so as to degrade the heat exchange efficiency of the air conditioners 21 to 25 since the processing loads are large. In addition, the controller 30 decreases the airflow volume of the first ventilation fan 46 to reduce an amount of electric power to be consumed by the first ventilation fan 46 if the air temperature of the attic AT is less prone to change so as to degrade the heat exchange efficiency of the air conditioners 21 to 25 since the processing loads of the air conditioners 21 to 25 are small. Consequently, the air conditioning system 10 easily improves its entire energy efficiency.

(12-5)

As described in the fourth embodiment and Modifications 4A to 4C, the controller 30 performs the feedback control to change the airflow volume of the first ventilation fan 46 such that the actual temperature of the attic AT becomes equal to the target temperature of the attic AT. Therefore, the air conditioning system 10 efficiently modifies the airflow volume of the first ventilation fan 46 even if unexpected disturbance causes the air temperature of the attic AT to change so as to degrade the heat exchange efficiency of the air conditioners 21 to 25. As described above, the air conditioning system 10 enables stable and efficient shared use of air in the common space among the air conditioners 21 to 25 for the purpose of heat exchange.

(12-6)

As described in Modification 4B, the controller 30 performs the feedforward control to correct the change in airflow volume of the first ventilation fan 46, based on the information relating to the prospective air temperature of the attic AT. With this configuration, the air conditioning system 10 suppresses occurrence of a situation in which expectable disturbance causes the air temperature of the attic AT to change so as to degrade the heat exchange efficiency of the air conditioners 21 to 25. The air conditioning system 10 thus minimizes a difference between the air temperature and target temperature of the attic AT due to the disturbance.

REFERENCE SIGNS LIST

10: air conditioning system
21 to 25: air conditioner
30: controller (example of control device)
46: first ventilation fan
47: second ventilation fan
51: common space temperature sensor
61: usage-side heat exchanger
62: heat source-side heat exchanger
63: heat source-side fan

CITATION LIST

Patent Literature

Patent Literature 1: JP S48-2756 A

The invention claimed is:

1. An air conditioning system for implementing air conditioning in an air-conditioning target space of an indoor area by carrying out heat exchange with air in a common space that is disposed on a periphery of the air-conditioning target space in the indoor area and is not subjected to air conditioning, the air conditioning system comprising:
a plurality of air conditioners each including:
a usage-side heat exchanger configured to carry out heat exchange with air in the air-conditioning target space;
a heat source-side heat exchanger configured to carry out heat transfer to and from the usage-side heat exchanger,
the heat source-side heat exchanger being disposed in the common space; and
a heat source-side fan configured to feed air from the common space to the heat source-side heat exchanger and to blow the air into the common space;
at least one ventilation fan whose airflow volume is changeable,
the at least one ventilation fan being disposed near an intake port through which air in an outdoor area is taken in the common space and/or an exhaust port through which air is discharged from the common space toward the outdoor area; and
a controller configured to change the airflow volume of the at least one ventilation fan, based on information on an air temperature of the common space, wherein
the controller is configured to detect a number of operating air conditioners among the plurality of air conditioners, and
the controller employs the number of operating air conditioners among the plurality of air conditioners as the information on the air temperature of the common space, and changes the airflow volume of the at least one ventilation fan, based on the number of operating air conditioners.

2. The air conditioning system according to claim 1, wherein
the controller performs feedback control to compare information on an actual temperature of the common space with information on a target temperature of the common space and to change the airflow volume of the at least one ventilation fan such that the actual temperature of the common space becomes equal to the target temperature of the common space.

3. An air conditioning system for implementing air conditioning in an air-conditioning target space of an indoor area by carrying out heat exchange with air in a common space that is disposed on a periphery of the air-conditioning target space in the indoor area and is not subjected to air conditioning, the air conditioning system comprising:
a plurality of air conditioners each including:
a usage-side heat exchanger configured to carry out heat exchange with air in the air-conditioning target space;

a heat source-side heat exchanger configured to carry out heat transfer to and from the usage-side heat exchanger, the heat source-side heat exchanger being disposed in the common space; and a heat source-side fan configured to feed air from the common space to the heat source-side heat exchanger and to blow the air into the common space;

at least one ventilation fan whose airflow volume is changeable, the at least one ventilation fan being disposed near an intake port through which air in an outdoor area is taken in the common space and/or an exhaust port through which air is discharged from the common space toward the outdoor area; and a controller configured to change the airflow volume of the at least one ventilation fan, based on information on an air temperature of the common space, wherein the controller is configured to acquire information on amounts of processing load of the plurality of air conditioners, and the controller employs the information on the amounts of processing load of the plurality of air conditioners as the information on the air temperature of the common space, and changes the airflow volume of the at least one ventilation fan, based on the amounts of processing load.

4. The air conditioning system according to claim 3, wherein the controller performs feedback control to compare information on an actual temperature of the common space with information on a target temperature of the common space and to change the airflow volume of the at least one ventilation fan such that the actual temperature of the common space becomes equal to the target temperature of the common space.

\* \* \* \* \*